United States Patent
Zimmermann et al.

(10) Patent No.: US 12,179,431 B2
(45) Date of Patent: Dec. 31, 2024

(54) ADDITIVE MANUFACTURING USING SOLID STATE OPTICAL DEFLECTORS

(71) Applicant: General Electric Company, Schenectady, NY (US)

(72) Inventors: Maik Zimmermann, Lichtenfels (DE); Florian Bechmann, Lichtenfels (DE); Fabian Zeulner, Lichtenfels (DE)

(73) Assignee: General Electric Company, Evendale, OH (US)

( * ) Notice: Subject to any disclaimer, the term of this patent is extended or adjusted under 35 U.S.C. 154(b) by 120 days.

(21) Appl. No.: 17/363,219

(22) Filed: Jun. 30, 2021

(65) Prior Publication Data

US 2023/0001639 A1  Jan. 5, 2023

(51) Int. Cl.
| | | |
|---|---|---|
| *B29C 64/273* | (2017.01) | |
| *B29C 64/153* | (2017.01) | |
| *B29C 64/245* | (2017.01) | |
| *B29C 64/393* | (2017.01) | |
| *B33Y 10/00* | (2015.01) | |
| *B33Y 30/00* | (2015.01) | |

(52) U.S. Cl.
CPC .......... *B29C 64/273* (2017.08); *B29C 64/153* (2017.08); *B29C 64/245* (2017.08); *B29C 64/393* (2017.08); *B33Y 10/00* (2014.12); *B33Y 30/00* (2014.12)

(58) Field of Classification Search
CPC ..... B29C 64/20; B29C 64/153; B29C 64/245; B29C 64/273; B29C 64/268; B29C 64/393; B33Y 10/00; B33Y 30/00; B22F 12/41; B22F 10/28; B22F 10/366
See application file for complete search history.

(56) References Cited

U.S. PATENT DOCUMENTS

| | | | |
|---|---|---|---|
| 4,344,677 A | | 8/1982 | Stuermer et al. |
| 5,014,207 A | * | 5/1991 | Lawton ............... G09B 25/00 |
| | | | 427/512 |
| 5,018,150 A | * | 5/1991 | Wojnarowski .......... H01S 3/086 |
| | | | 372/9 |
| 7,820,241 B2 | | 10/2010 | Perret et al. |
| 7,976,302 B2 | | 7/2011 | Halder et al. |
| 8,031,384 B2 | | 10/2011 | Perret et al. |
| 9,849,543 B2 | | 12/2017 | Scott et al. |
| 10,137,636 B2 | | 11/2018 | Meisner et al. |
| 10,744,598 B2 | | 8/2020 | Hall |
| 11,260,584 B2 | | 3/2022 | Krol et al. |

(Continued)

FOREIGN PATENT DOCUMENTS

| | | |
|---|---|---|
| DE | 102018206361 A1 | 10/2019 |
| WO | 2019149612 A1 | 8/2019 |

*Primary Examiner* — Jerzi H Moreno Hernandez
(74) *Attorney, Agent, or Firm* — Dority & Manning, P.A.

(57) ABSTRACT

An additive manufacturing apparatus comprises a laser beam source emitting a laser beam, a build platform, a powder source depositing a layer of powder onto the build platform, and a scanning assembly disposed along an optical path between the laser beam source and the build platform. The scanning assembly comprises at least one solid state optical deflector that modifies at least one of a size or an impingement location of the laser beam on the layer of powder at a scanning position of the laser beam. The at least one solid state optical deflector may be used to heat treat the layer of powder either before or after the powder is melted.

15 Claims, 9 Drawing Sheets

(56) References Cited

U.S. PATENT DOCUMENTS

| | | | | |
|---|---|---|---|---|
| 2006/0215246 A1* | 9/2006 | Kerekes | ............... | G02B 26/105 |
| | | | | 359/201.1 |
| 2010/0270713 A1 | 10/2010 | Frangov et al. | | |
| 2012/0132627 A1* | 5/2012 | Wescott | ................. | B22F 10/25 |
| | | | | 219/121.65 |
| 2013/0154160 A1* | 6/2013 | Cooper | ................ | B29C 64/135 |
| | | | | 425/150 |
| 2016/0107263 A1* | 4/2016 | Koerber | ................. | B22F 10/28 |
| | | | | 219/76.12 |
| 2016/0288254 A1* | 10/2016 | Pettit | ..................... | B33Y 30/00 |
| 2017/0252860 A1* | 9/2017 | Bamberg | ........... | B23K 15/0086 |
| 2018/0207722 A1* | 7/2018 | Feldmann | ............. | B29C 64/153 |
| 2018/0326664 A1* | 11/2018 | DeMuth | ............... | B29C 64/153 |
| 2018/0345382 A1* | 12/2018 | Roychowdhury | ..... | B33Y 10/00 |
| 2020/0398340 A1* | 12/2020 | Kusaka | .................. | B22F 12/49 |
| 2021/0354372 A1* | 11/2021 | Krol | ...................... | B29C 64/153 |
| 2023/0150190 A1* | 5/2023 | Gruber | ................. | B29C 64/135 |
| | | | | 430/322 |
| 2023/0158571 A1* | 5/2023 | Meiners | ................ | B33Y 30/00 |
| | | | | 419/6 |

* cited by examiner

ADDITIVE MANUFACTURING USING SOLID STATE OPTICAL DEFLECTORS

FIELD

The present specification generally relates to additive manufacturing. More particularly, the present specification is directed to additive manufacturing apparatuses incorporating at least one solid state optical deflector and methods of using the same.

TECHNICAL BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

For example, existing laser beam powder bed fusion ("LPBF") AM apparatuses may manufacture objects in a layer-by-layer pattern by exposing layers of powder disposed on a build platform to a laser beam in predetermined patterns. The laser beam may selectively melt the layers of powder to cause the powder to melt and fuse in accordance with a layer structure for the object. Existing LPBF apparatus may rely on mechanical scanning devices (e.g., galvanometric scanners) to direct the laser beam on the layers of powder in the desired patterns. The speed at which such mechanical scanning devices may scan the laser beam is limited in speed by the inertia of the optical elements (e.g., mirrors) contained therein. Low scanning speeds may result in vaporization in the powder from large amounts of flux (or track energy) being incident on the powder and reduced process efficiency. Moreover static optical elements that may be used for beam shaping, such as diffractive optical elements, phase plates, aspherical lenses, and the like, are inflexible in terms of the beam-shape geometries that they can create. As such, conventional optical systems have limited capacity for manipulating laser beams in additive manufacturing apparatuses.

SUMMARY

In one embodiment, an additive manufacturing apparatus comprises a laser beam source emitting a laser beam, a build platform, a powder source depositing a layer of powder onto the build platform, and a scanning assembly disposed along an optical path between the laser beam source and the build platform. The scanning assembly comprises at least one solid state optical deflector that modifies at least one of a size or an impingement location of the laser beam on the layer of powder at a scanning position of the laser beam.

In another embodiment, an additive manufacturing apparatus comprises a laser beam source emitting a laser beam, a build platform, a powder source depositing a layer of powder onto the build platform, a solid state optical deflector that modulates a propagation direction of the laser beam at an angular velocity, and an optical assembly that conditions the laser beam prior to the laser beam being incident on the layer of powder.

In another embodiments, a method of additively manufacturing an object comprises depositing a layer of powder on a build platform, generating a laser beam with a laser beam source, and scanning the laser beam in a predetermined scanning pattern over the build platform to melt the layer of powder in a manner that corresponds the predetermined scanning pattern. The scanning of the laser beam comprises modulating a propagation direction of the laser beam using a solid state optical deflector prior to the laser beam being incident on a layer of powder.

Additional features, advantages, and embodiments of the processes and systems described herein will be set forth in the detailed description which follows, and in part will be readily apparent to those skilled in the art from that such features, advantages, and embodiments are contemplated and considered within the scope of the disclosure, based on the teachings disclosed hereupon.

It is to be understood that both the foregoing general description and the following detailed description describe various embodiments and are intended to provide an overview or framework for understanding the nature and character of the subject matter claimed and described herein. The accompanying drawings are provided to facilitate a further understanding of the various embodiments, and are incorporated into and constitute a part of this specification. The drawings illustrate the various embodiments described herein, and together with the description serve to explain the principles and operations of the subject matter claimed and described herein.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
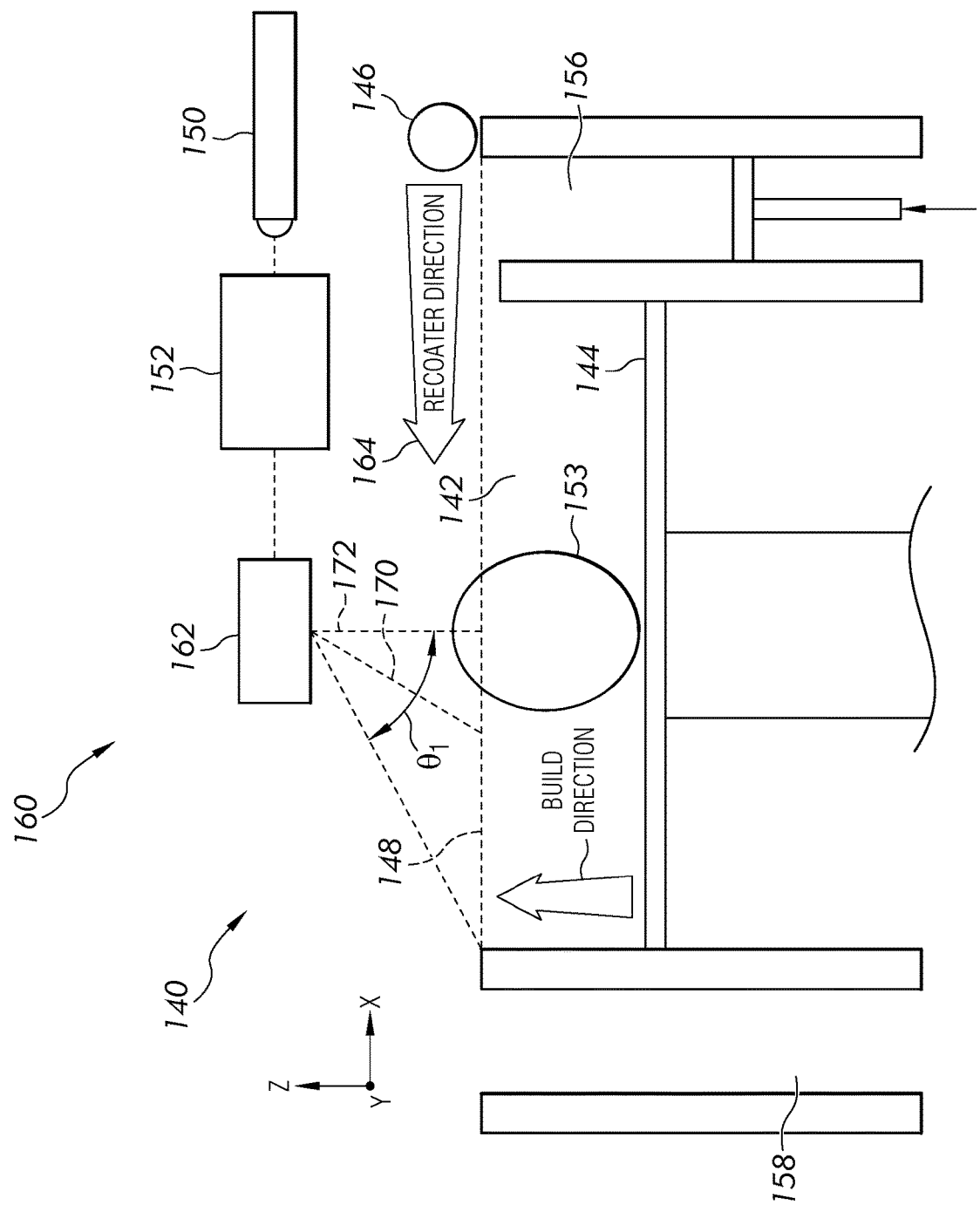
FIG. 1 schematically depicts an additive manufacturing apparatus comprising at least one solid state optical deflector, according to one or more embodiments described herein.

Reference will now be made to various embodiments of scanning assemblies for additive manufacturing apparatuses comprising at least one solid state optical deflector. The at least one solid state optical deflector may be used to modulate a propagation direction of an laser beam used to fuse build material (e.g., powder) on a build platform of an additive manufacturing apparatus. In embodiments, the at least one solid state optical deflector may modulate the propagation direction of the laser beam on a time scale (e.g., at at least 10 times faster than currently used galvanometric scanners) that is less than an interaction time required for the laser beam to melt or fuse the build material, such that the at least one solid state optical deflector can be used to form arbitrary quasi-static energy distributions at various locations on the build platform. The at least one solid state optical deflector beneficially enables energy distributions provided to the build material to be tailored based on location on the build platform and within the object being built, adding a level of flexibility not yet obtainable using existing scanning assemblies.

The solid state deflectors of the scanning assemblies described herein beneficially facilitate the integration of relatively high average power laser sources typically not used in existing additive manufacturing apparatuses. For example, in embodiments, the additive manufacturing apparatuses described herein may comprise a master oscillator power amplifier ("MOPA") laser source or a master oscillator fiber amplifier ("MOFA") laser source generating a pulsed laser beam having an average laser power greater than or equal to 100 W (e.g., 200 W, 300 W, 400 W, 1 kW, etc.), a pulse width in the nanosecond, picosecond, or femtosecond range (e.g., a pulse duration ranging from 1 femtosecond to less than or equal to 100 miliseconds) and a pulse repetition rate ranging from 1 kHz to greater than 1 MHz. The limited scanning velocity obtainable via existing scanning assemblies (e.g., galvanometric scanners) renders such sources incompatible with many additive manufacturing processes, as significant pulse-to-pulse overlap along the scanning direction may lead to material evaporation. By incorporating at least one solid state optical deflector, however, the scanning assemblies described herein enable manipulation of the laser beam at a sufficient rate to avoid such material evaporation, allowing efficiency benefits associated with higher-power laser sources to be realized. In embodiments, the solid state optical deflectors may be manipulated to adjust an amount of pulse-to-pulse overlap in a pulsed laser beam source, thereby allowing build process parallelization.

The ultrafast laser beam manipulation facilitated by the solid state optical deflectors described herein may also be used to correct beam shape irregularities inherent in existing build processes. For example, in embodiments, an laser beam used by the additive manufacturing apparatus to fuse the build material is focused to a minimum spot size at the build platform when the laser beam is traveling along a central axis of the scanning assembly. When the laser beam is traveling along the central axis, the minimum spot size may have a particular shape (e.g., circular). If the scanning assembly is manipulated such that the laser beam diverges from the central axis of the scanning assembly, the beam shape and spot size may vary. The energy distribution provided by the laser beam to the build material may vary as a function of beam propagation direction. The at least one solid state optical deflector described herein may be used to counteract such beam shape variation by manipulating the propagation direction of the laser beam in a predetermined pattern dependent on the propagation direction of the laser beam. Such predetermined directionally-dependent patterns may be tailored such that a consistent energy distribution is provided to the build material, irrespective of the propagation direction of the laser beam, thereby facilitating a more uniform fusing of the build material and better build quality.

As used herein, the term "solid state optical deflector" is used to refer to an optical reflector that relies on a transient refractive index induced by a controllable external source (e.g., electro-magnetic fields, propagating sound waves, ultrasonic waves) to alter a propagation direction of light rays propagating therethrough.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" (or "substantially" or "approximately") is used in describing a value or an end-point of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint. For example, the approximating language may refer to being within a 1, 2, 4, 10, 15, or 20 percent margin in either individual values, range(s) of values and/or endpoints defining range(s) of values.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Referring now to FIG. 1, an additive manufacturing apparatus 140 is depicted in accordance with an example embodiment. The additive manufacturing apparatus 140 depicted in FIG. 1 builds objects or portions of objects, for example, the object 153, in a layer-by-layer manner by sintering or melting a build material (e.g., a powder, not depicted) using a laser beam 170 generated by a laser beam source 150. In the depicted example, powder from a powder reservoir 156 is distributed in layers over a build platform 144 by a recoater 146, and excess powder is deposited into an excess powder reservoir 158 disposed on an opposite side of the build platform 144 from the powder reservoir 156. Once the layer of powder is deposited on the build platform 144, the laser beam 170 may be directed in a predetermined pattern over the build platform 144. The energy density of the laser beam 170 may be sufficient to melt or sinter the powder to form a melt pool that solidifies in a pattern corresponding to a cross-sectional shape of the object 153. The movement pattern of the laser beam 170 may be controlled by a scanning assembly 160.

In embodiments, the scanning assembly 160 includes a beam conditioning system 152 and at least one solid state optical deflector 162. The beam conditioning system 152 may include one or more optical elements (e.g., an optical assembly) that condition the laser beam 170 (e.g. focus the laser beam 170, expand the laser beam 170, collimate the laser beam 170, serve as a switching unit for the laser beam 170) prior to the laser beam 170 being incident on the build platform 144. The scanning assembly 160 further includes at least one solid state optical deflector 162 that modulates an impingement location of the laser beam 170 on the build platform 144. The at least one solid state optical deflector 162 at least partially determines a pattern in which the laser beam 170 melts or sinters the particulate material disposed on the build platform 144.

In embodiments, the at least one solid state optical deflector 162 may be capable of modulating a propagation direction of the laser beam 170 at maximal angular velocities greater than (e.g., at least 2 times greater, at least 5 times greater, at least 10 times greater, etc.) the capabilities of current scanners (e.g., galvanometric scanners, polygon scanners, microelectromechanical scanners, and the like). In embodiments, the maximum achievable angular velocity with which the at least one solid state optical deflector 162 modulates the propagation direction of the laser beam 170 is based on the configuration of the at least one solid state optical deflector 162. In embodiments, the at least one solid state optical deflector 162 comprises an electro-optical deflector constructed of an optically transparent material utilizing the Pockels Effect, and may have a maximum angular velocity of greater than or equal to 2E3 rad/s and less than or equal to 20E3 rad/s. In embodiments, the at least one solid state optical deflector 162 comprises an electro-optical deflector constructed of an optically transparent material utilizing the Kerr effect, and may have a maximum angular velocity of less than or equal to 40E3 rad/s. In embodiments, the at least one solid state optical deflector 162 comprises an acousto-optical deflector, and has a maximum angular velocity of greater than or equal to 5E3 rad/s and less than or equal to 250E3 rad/s. It should be appreciated that the at least one solid state optical deflector 162 (or any of the other solid state optical deflectors described herein) may be operated to modulate the laser beam 170 at any rate that is less than or equal to the achievable maximum angular velocities described herein.

The range of angular velocities provided by the at least one solid state optical deflector 162 enhances flexibility of the scanning assembly 160 in terms of the distribution of energy provided to the particulate material on the build platform 144. For example, in embodiments, the laser beam 170 may be manipulated by the at least one solid state optical deflector 162 prior to melting the particulate material. For example, the solid state optical deflector 162 may modulate the propagation direction of the laser beam 170 at a relatively high angular rate such that the laser beam 170 does not interact with the particulate material for an interval long enough to actually melt the particulate material, but instead pre-heats the particulate material. Such pre-heating provided by the at least one solid state optical deflector 162 may beneficially control thermal gradients within the particulate material to avoid stress accumulation and potential defects. Similar heat treatments to the particulate material via the at least one solid state optical deflector 162 are also possible after melting of the particulate material. For example, after the particulate material in a particular area is melted during scanning of the laser beam 170 at a lesser angular velocity, the at least one solid state optical deflector 162 may re-scan the area at a greater angular velocity to provide post-melting heat treatments that may control the viscosity of melted material to provide control over the grain structure of the solidified material.

In embodiments, the at least one solid state optical deflector 162 modulates the propagation direction of the laser beam 170 during melting of the particulate material so as to modify a size of the melt pool formed therein per scanning interval. For example, as described herein, the solid state optical deflector 162 may manipulate the propagation direction of the laser beam 170 in various sub-patterns as the laser beam 170 is being scanned along a primary scanning direction to tailor the size and/or shape of the melt pool based on the portion of the object 153 being fused. As such, the at least one solid state optical deflector 162 may be used to adjust both the timing and distribution of energy provided to the particulate material in order to provide customized melt pools and/or heat treatments that improve build quality.

In embodiments, the at least one solid state optical deflector 162 comprises an acousto-optical deflector or an electro-optical deflector. Electro-optical deflectors may rely on a change in refractive index of an optically transparent material in response to application of an electric voltage to the optically transparent material. The electrical voltage may perturb the position, orientation, or shape of the atomic-molecular structure of the optically transparent material to modify the refractive index and induce a phase delay across the cross-section of the laser beam 170 when the laser beam propagates through the optically transparent material. In embodiments, an optically transparent material having a refractive index that varies linearly with voltage (e.g., utilizing the Pockels effect), such as $LiNbO_3$, $LiTaO_3$, and $KTiOPO_4$ is used. In embodiments, an optically transparent material where the Kerr effect predominately varies the refractive index quadratically with field strength, such as KTN and/or $KTa_{1-x}Nb_xO_3$, is used. The particular optically transparent material that may be used in the at least one solid state optical deflector 162 may vary depending on desired performance characteristics. For example, Pockels effect-based electro-optical deflectors may have higher modulation frequency capabilities (in the MHz range) but relatively low maximal deflection angles as compared to Kerr-effect based deflectors. As such, where a greater deflection capability is desired, a Kerr effect-based electro-optical deflector may be used.

In embodiments, the optically transparent material is temperature-controlled to a temperature where the electro-optical effect is increased in magnitude. The optically transparent material may take various shapes (e.g., prism-shaped, parallelepiped-shaped, etc.) depending on the implementation. In embodiments, an electrode pair is disposed on the optically transparent material to supply the electric field for varying the refractive index of the optically transparent material. The electrode pair may extend on faces of the optically transparent material that are arranged in a direction extending parallel to the propagation direction of the laser beam 170. The electrode pair may be coupled to a power source that applies a voltage differential across the electrode pair. In embodiments, the electrode pair applies an electric field in a direction extending perpendicular to the propagation direction of the laser beam 170 and the amount that the laser beam 170 is deflected varies with the magnitude of the voltage supplied by the power source and dimensions of the optically transparent material. In embodiments, a plurality of elements of optically transparent material are arranged in series to enhance the maximum deflection angle capabilities of the electro-optical deflectors.

In embodiments, the at least one solid state optical deflector 162 comprises an acousto-optical deflector. The acousto-optical deflector may comprise an optically transparent material having a density that is modified by sound waves or ultrasonic waves that are propagated through the optically transparent material. In embodiments, the optically transparent material is constructed of $TeO_2$, $PbMoO_4$, or any other suitable material. For example, the sound waves may periodically alter the refractive index of the optically transparent material, and the periodic variations in refractive index may act like an optical grating moving at the speed of sound in the optically transparent material. The optical grating diffracts the laser beam 170 depending on the frequency of the acoustic signal propagating through the optically transparent material. In embodiments, the acousto-optical deflector includes a sound source emitting the acoustic signal that propagates perpendicular to the propagation direction of the laser beam 170 and an acoustical absorber that absorbs the sound waves after propagation through the transparent optical material. The transducer may have an acoustic bandwidth (e.g., of frequencies less than or equal to 500 MHz) to provide a tunable amount of deflection of the laser beam 170.

In embodiments, the laser beam source 150 is a pulsed laser beam source or a continuous wave ("CW") laser beam source (e.g., a modulated CW laser beam source). The components of the scanning assembly 160 and/or the beam conditioning system 152 may be determined at least in part by the type of laser beam (e.g., pulsed or continuous wave) emitted by the laser beam source 150. For example, in embodiments, the optically transparent material of the at least one solid state optical deflector 162 may have a relatively low CW laser damage threshold (e.g., less than 500 $MW/m^2$, or even less than 1 $MW/m^2$). Given this, if the laser beam source 150 is a CW laser beam source (e.g., a single mode fiber laser) that comprises a sufficiently high energy density to damage the optical transparent material of the at least one solid state optical deflector 162, the beam conditioning system 152 may include an optical switching element or the like where intervals of the laser beam 170 are directed away from the at least one solid state optical deflector 162. In such embodiments, the optical switching element may convert the laser beam 170 to a pulsed laser beam that is incident on the at least one solid state optical deflector 162. Intervals between the pulses incident on the at least one solid state optical deflector 162 may vary depending on the implementation. In embodiments, the pulse repetition rate of the laser beam 170 (e.g., determined based on the source itself, an external optical switching element, or any combination thereof) may be determined based at least in part on a desired pulse-to-pulse overlap of the laser beam 170 during scanning across the build platform 144. In embodiments, successive pulses of the laser beam 170 may overlap one another to effectively alter a size of a formed melt pool. In embodiments, successive pulses of the laser beam 170 do not overlap one another such that there are gaps or spaces between positions of incidence of the successive pulses on the build platform 144. Various aspects of the laser beam 170 (e.g., pulse interval, repetition rate, etc.) may be adjusted depending on the energy distribution desired to be distributed to the build platform 144.

In embodiments, the laser beam source 150 comprises a pulsed beam laser source (e.g., a MOPA or a MOFA laser beam source). Such laser beam sources may have an average power output of greater than 100 W (e.g., greater than or equal to 200 W, greater than or equal to 500 W, 1 kW, 5 kW), with nanosecond pulse widths (e.g., less than 200 ns) and a pulse repetition rate of up to 20 MHz. The use of such laser sources as the laser beam source 150 with existing, galvanometric or piezoelectric scanners is problematic, especially at high pulse repetition rates in the MHz range, where heat accumulation is especially prevalent because the relatively low rate angular velocity provided by such scanners provides insufficient lateral displacement between pulses, leading to heat accumulation in areas of significant pulse-to-pulse overlap. Such heat accumulation may lead to vaporization of the powder layers on the build platform 144 and overall process inefficiencies. By increasing the angular velocity displacement potential of the scanning assembly 160, the at least one solid state optical deflector 162 beneficially prevents such heat accumulation between pulses and facilitates higher-power laser sources (e.g., even laser sources in the kW average power range) being used in the additive manufacturing apparatus 140. Such higher-power sources may increase overall processing efficiencies and reduce overall build times.

The at least one solid state optical deflector 162 may also improve performance in embodiments where the laser beam source 150 is CW laser source (e.g., a single mode fiber laser commonly employed in LBPF processes, an internally modulated CW laser source, or the like). Such lasers typically output laser beams having a Gaussian energy distribution, with the energy density being relatively high near a radial center of the laser beam and exponentially dropping as a function of distance from the radial center. A Gaussian distribution may provide excessive energy near the radial center of the laser beam, causing evaporation of the powder. Such evaporation may result in vapor pressure that ejects powder from the center of the melt pool and places the ejected powder towards the periphery of the laser spot at the powder. Such re-deposited powder may interfere with subsequent scan lines in the forming of the object 153 and result in overall processing deficiencies. The at least one solid state optical deflector 162 overcomes such deficiencies by allowing manipulation of the laser beam 170 at small time scales that are less than the amount of time required to form a melt pool. In embodiments, the laser beam 170 may be manipulated to form various sub-patterns as the laser beam 170 is moved in a primary scanning pattern to provide energy density distributions (e.g., flat-top, m-shaped, etc.) that allow for uniform energy coupling throughout each sub-pattern. That is, by relatively fast angular movement of the laser beam 170 in directions other than the primary scanning direction, energy density distributions that are well-suited for the particular build task may be used.

In embodiments, the relatively high rate of deflection of the laser beam 170 provided by the at least one solid state optical deflector 162 may also be used to alleviate distortion effects associated with scanning systems typically used in LBPF apparatuses, irrespective of the type of laser source used. For example, existing LBPF apparatuses may commonly use the previously-mentioned single mode fiber lasers in conjunction with a non-telecentric scanning systems. Such scanning systems may increasingly distort the shape of the energy-density distribution as the angle $\theta_1$ from a central axis 172 of the scanning assembly 160 increases. That is, in conventional LBPF apparatuses, the energy density distribution of the laser beam 170 when being scanned at a peripheral region of the build platform 144 may significantly differ in shape than when being scanned at a central region of the build platform 144, leading to melt pattern inconsistencies and a degradation in build quality. The at least one solid state optical deflector 162 may be used to scan the laser beam 170 in sub-patterns that counteract such distortion associated with traditional scanning systems such that the energy density distribution of the laser beam 170 is consistent irrespective of the angle $\theta_1$ from the central axis 172

In embodiments, the at least one solid state optical deflector 162 modulates the positioning of the laser beam 170 on the build platform 144 at a rate that is faster than a transient aspect of the laser beam (e.g., a spot size of the laser beam 170 at the build platform 144 multiplied by a pulse interval or a rate of movement of the laser beam 170 caused by an additional scanning element of the scanning assembly 160 or relative movement between the laser beam source 150 and the build platform 144). For example, in embodiments, an additional scanning element of the scanning assembly 160 (not depicted in FIG. 1) may move the laser beam 170 over the build platform 144 at a maximal angular velocity that is a fraction of that of the at least one solid state optical deflector 162 (e.g., less than or equal to one half, less than or equal to one fifth, less than or equal to one tenth) in a primary scanning direction. While the laser beam 170 is being scanned in the primary scanning direction by the additional scanning element, the at least one solid state optical deflector 162 may manipulate the precise position of incidence of the laser beam 170 at an angular velocity that is a multiple of the scan rate in the primary scanning direction. In embodiments, the least one solid state optical deflector 162 may fine-tune the positioning of the laser beam 170 using a deflection speed that is at least 10 times greater as compared to the additional scanning element in the primary scanning direction. The at least one solid state optical deflector 162 thus provides an additional degree of freedom for tuning various aspects (e.g., beam shape, energy density distribution) of the laser beam 170 while the laser beam 170 is being scanned in the primary scanning direction.

Referring still to FIG. 1, in embodiments, the beam conditioning system 152 conditions (e.g., collimates, condenses, focuses) the laser beam 170 to deliver a required energy density to a build surface 148 such that the build material is modified in a desired manner. In embodiments, the beam conditioning system 152 modifies a cross-section of the laser beam 170 such that the laser beam 170 is not clipped by a limited aperture of the at least one solid state optical deflector 162. For example, in embodiments, the at least one solid state optical deflector 162 may have an aperture that is less than that of typically used scanners, and, depending on the beam size output from the laser beam source 150, the laser beam 170 may be contracted by the beam conditioning system 152 to avoid signal clipping. In embodiments, the beam conditioning system 152 comprises a telescope for condensing the beam size of the laser beam 170 based on the aperture of the at least one solid state optical deflector 162. In embodiments, the beam conditioning system 152 comprises a focusing lens for providing a desired beam spot size at the build platform 144. While the beam conditioning system 152 is depicted as being upstream of the at least one solid state optical deflector 162, it should be appreciated that the beam conditioning system 152 (or any additional optical components of the additive manufacturing apparatus 140 such as a focusing lens) may be placed anywhere between the laser beam source 150 and the object 153 consistent with the present disclosure. For example, in embodiments, a focusing lens (e.g., f-theta lens) is disposed between the scanning assembly 160 and the build platform 144 to focus the laser beam 170 onto the layer of powder.

In operation, as each layer of the object 153 is formed, the relative distance between a build platform 144 and the scanning assembly 160 may be changed (e.g., the build platform 144 may be lowered) and an additional layer of the object 153 is formed (e.g., via a recoater 146 forming an additional layer of powder at the build surface 148 in a recoater direction 164, with any excess powder being pushed to the excess powder reservoir 158). For example, after the build platform 144 is lowered, another layer of build material may be spread over the build platform 144 and the object 153. The additional layer of build material may modified by moving the laser beam 170 in another pattern via the scanning assembly 160 to form the additional layer of the object 153.

The laser beam 170 may be controlled by a computer system including a processor and a memory (not depicted). The computer system may determine a scanning pattern for each layer and control the laser beam 170 (e.g., via the scanning assembly 160) to irradiate the build material according to the scanning pattern. After fabrication of the object 153 is complete, various post-processing procedures may be applied to the object 153. Post-processing procedures include removal of excess powder by, for example, blowing or vacuuming. Other post processing procedures include a stress relief heat treat process. Additionally, thermal and chemical post processing procedures can be used to finish the object 153.

Depending on the particular implementation of the additive manufacturing apparatus 140 the at least one solid state optical deflector 162 may be used in a number of different ways to increase overall build process efficiency and/or build quality. For example, where the laser beam source 150 is a continuous-wave laser (e.g., rather than a pulsed laser) the at least one solid state optical deflector 162 may be used to scan the laser beam 170 in sub-patterns as the laser beam 170 is moved along a primary scanning pattern (e.g., via an additional scanning element) to expand melt pools formed along the primary scanning direction and/or particularize energy density distribution shapes for the portion of the object 153 being formed. When the laser beam source 150 is a pulsed laser beam or a modulated CW laser beam, the at least one solid state optical deflector 162 may be used to spatially separate individual pulses (or adjust an amount of overlap between pulses) in order to avoid material evaporation and enhance process efficiencies. Additionally, as described herein, the at least one solid state optical deflector 162 may be used to move the laser beam 170 in various movement patterns over the particulate material either before or after the particulate material is melted (e.g., either prior to melt pool formation or after melt pool formation) to control thermal gradients within the particulate material and/or viscosity of the melted material. Various examples of scanning assemblies incorporating at least one solid state optical deflector will now be described.

Figure 2A:
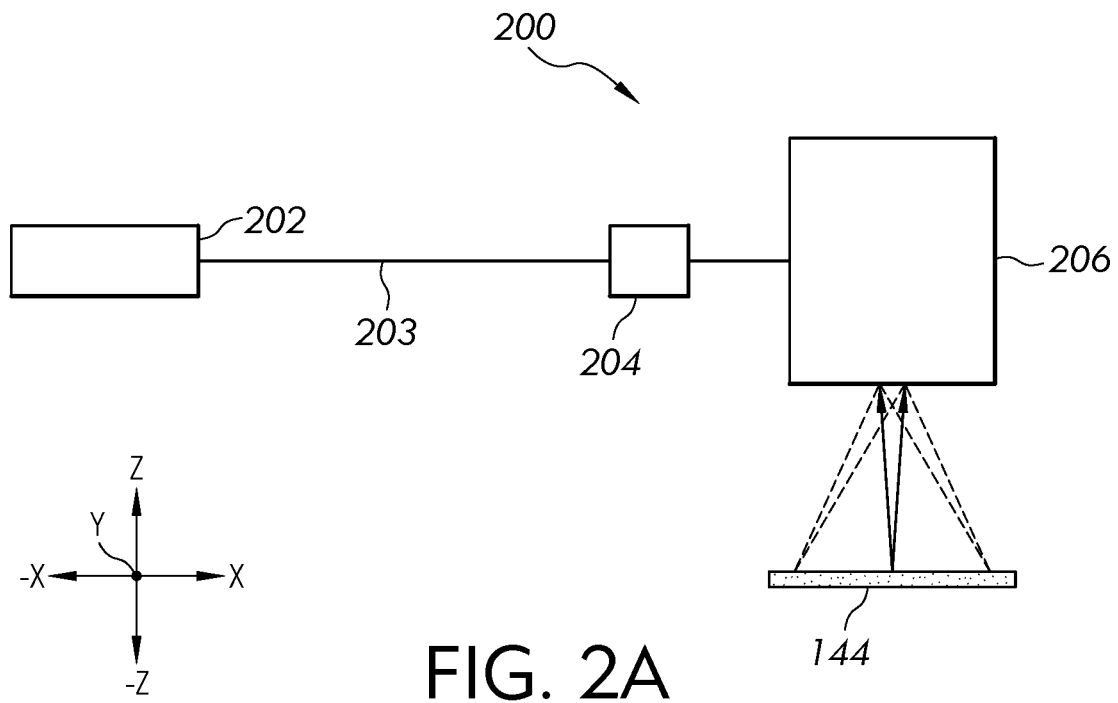
FIG. 2A schematically depicts a scanning assembly comprising a solid state optical deflector and laser beam source for an additive manufacturing apparatus, according to one or more embodiments described herein.

FIG. 2A schematically depicts an example implementation of a scanning assembly 200 and a laser beam source 202. It should be understood that the depicted configuration omits various components (e.g., beam conditioning optics, polarization elements, filters, and the like) for purposes of explanation. In embodiments, the scanning assembly 200 and the laser beam source 202 may be used in place of the laser beam source 150 and the scanning assembly 160 of the additive manufacturing apparatus 140 described herein with respect to FIG. 1. In the depicted embodiment, the laser beam source 202 is a pulsed laser beam source that emits a pulsed laser beam 203 therefrom. In embodiments, the laser beam source 202 comprises a MOPA or MOFA laser source and various parameters associated with the pulsed laser beam 203, such as pulse duration, frequency, and average power may be adjusted depending on the particular object 153 (see FIG. 1) being constructed by the additive manufacturing apparatus 140. In embodiments, the pulse frequency of the pulsed laser beam 203 may be adjusted from greater than or equal to approximately 1 KHz and less than or equal to 20 MHz. The duration of each pulse of the pulsed laser beam 203 may be adjustable from the millisecond to the femtosecond range, depending on the particular laser beam source 202 used. In embodiments, the laser beam source 202 comprises an average power output of greater than 100 W (e.g., greater than or equal to 200 W, greater than or equal to 500 W, 1 kW, 5 kW.

The relatively high output pulse energies and repetition rate associated with the laser beam source 202 renders the layer of powder material disposed on the build platform 144 (see FIG. 1) susceptible to evaporation if there is significant overlap between successive pulses of the pulsed laser beam 203 therein. In order to avoid such pulse-to-pulse overlap, the pulsed laser beam 203 is translated on the build platform 144 at an angular velocity that is at least approximately equal to the beam spot size of the pulsed laser beam 203 on the layer of powder material (e.g., determined at least in part by the beam conditioning system 152 or a focusing lens disposed downstream of the scanning assembly 200) multiplied by the laser pulse frequency. If pulse frequencies towards the higher end of the capabilities of the laser beam source 202 are used, the required angular velocities may be greater than or equal 1000 rad/s, which is beyond the capabilities of many scanners (e.g., galvanometric scanners) traditionally used in LBPF additive manufacturing apparatuses.

Accordingly, the scanning assembly 200 comprises a solid state optical deflector 204 and a primary scanning element 206. The solid state optical deflector 204 is disposed between the primary scanning element 206 and the laser beam source 202. Such a configuration may beneficially avoid clipping of the pulsed laser beam 203 because the solid state optical deflector 204 may comprise a relatively limited aperture (e.g., less than 2 mm) as compared to the primary scanning element 206. In embodiments, the solid state optical deflector 204 comprises an acousto-optical deflector or an electro-optical deflector. In embodiments, the solid state optical deflector 204 comprises a plurality of acousto-optical or electro-optical deflectors, with each of the deflectors being configured to modify the propagation direction of the pulsed laser beam 203 in a different direction. For example, in embodiments, the solid state optical deflector 204 comprises a first electro-optical deflector configured to modify a propagation direction of the pulsed laser beam 203 along the Y-axis depicted in FIG. 2A and a second electro-optical deflector configured to modify a propagation direction of the pulsed laser beam 203 along the X-axis depicted in 2A. The solid state optical deflector 204 may alter the propagation direction of the pulsed laser beam 203 at a rad of 1000 rad/s or more.

In embodiments, the primary scanning element 206 comprises a galvanometric scanning device, a polygon wheel scanner, a piezoelectric scanner, a microelectromechanical (MEMS) scanner, or any other suitable scanning device. The primary scanning element 206 may have a greater maximum deflection angle than the solid state optical deflector 204, but be inhibited in maximum scanning rate due to inertial limitations imposed by the hardware thereof (e.g., by the mass of the mirrors). In embodiments, the solid state optical deflector 204 has a maximum deflection angle of less than or equal to 0.2 rad, while the primary scanning element 206 may have a maximum defection angle of less than or equal to approximately 1 rad. Thus, depending on the configuration of the additive manufacturing apparatus 140 (e.g., the size of the build platform 144, the axial distance between the solid state optical deflector 204 and the build platform 144, any focusing or conditioning optics disposed between the laser beam source 202 and the build platform 144), the maximum deflection angle provided by the solid state optical deflector 204 may not provide an adequate angular range of motion to permit the formation of objects 153 over a relatively small cross-sectional size. Accordingly, use of the primary scanning element 206, with greater angular range of motion, may permit formation of objects 153 having a larger-cross section while still retaining the benefits associated with the solid state optical deflector 204.

Figure 2B:
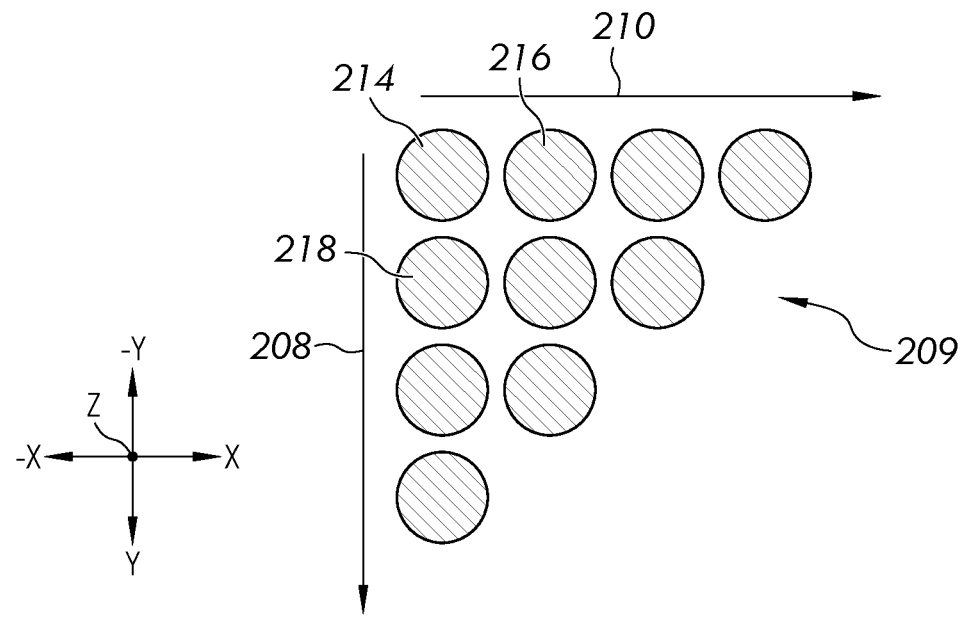
FIG. 2B schematically depicts a plurality of positions of incidence of a laser beam on a build platform of an additive manufacturing apparatus obtained via the scanning assembly depicted in FIG. 2A, according to one or more embodiments described herein.

The primary scanning element 206 may determine a primary scanning direction of the pulsed laser beam 203 (e.g., determining the overall pattern in which the pulsed laser beam 203 is moved over the layer of powder), while the solid state optical deflector 204 may modulate the precise impingement location of the pulsed laser beam 203 as the pulsed laser beam 203 is scanned in the primary scanning direction. For example, FIG. 2B depicts a pattern of a plurality of beam spots 209 in the plane of the build platform 144 depicted in FIG. 2A. That is, the plurality of beam spots 209 may represent positions of incidence of the pulsed laser beam 203 on the layer of powder at various points in time during the process of scanning the layer of powder to form a layer of the object 153 (see FIG. 1). In embodiments, each beam spot in the plurality of beam spots 209 represents a position of incidence of a separate pulse of the pulsed laser beam 203 on the build platform 144.

The plurality of beam spots 209 are generally arranged in an array extending in a primary scanning direction 208 and a secondary scanning direction 210. In embodiments, the primary scanning direction 208 is the direction at which the pulsed laser beam 203 is moved over the build platform 144 due to mechanical motion in the primary scanning element 206. The primary scanning element 206 may move the pulsed laser beam 203 in the primary scanning direction 208 at a primary scanning rate determined by a control signal provided to the primary scanning element 206. In embodiments, the primary scanning rate is less than or equal to 100 rad/s. The solid state optical deflector 204 may deflect the pulsed laser beam 203 in the secondary scanning direction 210 as the pulsed laser beam is being scanned in the primary scanning direction 208 via the primary scanning element 206. In the depicted example, the secondary scanning direction 210 is perpendicular to the primary scanning direction 208, though this need not be the case. The solid state optical deflector 204 may modulate the propagation direction of the pulsed laser beam 203 at a secondary scan rate that is at least 10 times higher than the primary scan rate. The secondary scan rate may be greater than the spot size of the pulsed laser beam 203 at the build platform times the pulse frequency of the laser beam source 202 such that successive ones of the plurality of beam spots 209 (e.g., associated with successive pulses) are separated from one another and do not overlap.

For example, as depicted in FIG. 2B, a first beam spot 214 associated with a first pulse of the pulsed laser beam 203 is offset from a second beam spot 216 associated with a second pulse of the pulsed laser beam 203 in the secondary scanning direction 210. Such pulse-to-pulse separation avoids head accumulation associated with higher-power pulsed laser beam sources and thereby prevents evaporation of the powder. In embodiments, beam spots associated with successive pulses of the pulsed laser beam 203 may overlap one another if the pulse intensity for a single pulse lies under the threshold intensity for evaporation of the powder (e.g., dependent on the particular material being used for the powder). In embodiments, a control signal (e.g., a voltage, a sound frequency) provided to the solid state optical deflector 204 is altered at a rate that is greater than the primary scan rate such that groupings of separate beam spots are incident on the layer of powder that extend along the secondary scanning direction 210. In embodiments, the control signal provided to the solid state optical deflector 204 is periodic and returns to an initial value such that an additional beam spot 218 is incident on the build platform 144 and aligned with the first beam spot 214 in the primary scanning direction 208 and also separated from the first beam spot 214. That is, by periodically modulating the impingement location of the pulsed laser beam 203 using the solid state optical deflector 204, the plurality of beam spots 209 are completely separated from one another in a controllable manner to deposit energy from the pulsed laser beam 203 in a desired pattern without inducing powder evaporation. Such an approach allows the process of solidifying layers of the object 153 to be parallelized to achieve overall processing efficiencies.

In embodiments, beam spots associated with separate pulses of the pulsed laser beam 203 may overlap one another (e.g., the magnitude of deflection provided by the solid state optical deflector 204 between successive pulses may be reduced as compared to the example depicted in FIG. 2B) to produce larger individual melt pools per scanning interval. Such larger individual melt-pools may be well-suited for less fine areas of the object 153. Thus, the solid state optical deflector 204, by providing a way to fine-tune the impingement location of successive pulses of the pulsed laser beam 203, may facilitate building efficiencies by process parallelization or permitting melting pool enlargement.

Figure 3A:
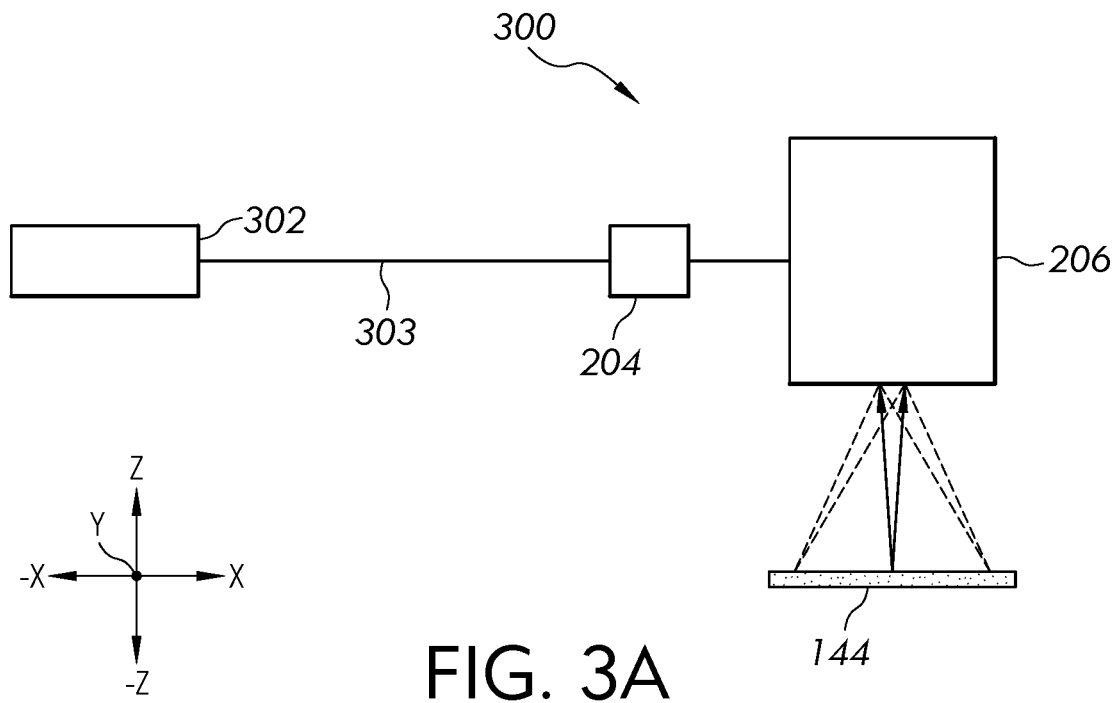
FIG. 3A schematically depicts a scanning assembly comprising a solid state optical deflector and laser beam source for an additive manufacturing apparatus, according to one or more embodiments described herein.

Benefits of the solid state optical deflector 204 may also be realized when a continuous wave laser is used. For example, FIG. 3A schematically depicts an example implementation of a scanning assembly 300 and a laser beam source 302. In embodiments, the scanning assembly 300 and the laser beam source 302 may be used in place of the laser beam source 150 and the scanning assembly 160 of the additive manufacturing apparatus 140 described herein with respect to FIG. 1. The scanning assembly 300 may be similar in structure to the scanning assembly 200 described herein with respect to FIG. 2A. Accordingly, like reference numerals may be used in the description of FIG. 3A to indicate the incorporation of such like components. The laser beam source 302 differs from the laser beam source 202 in that the laser beam source 302 is a continuous wave laser source producing a continuous wave laser beam 303 as opposed to a pulsed laser beam source. In embodiment the laser beam source 302 comprises a single mode fiber laser. In embodiments, the laser beam source 302 comprises a multimode fiber laser or a fiber laser with programmable output beam properties. In embodiments, the laser beam source 302 comprises a modulated laser beam source, and the continuous wave laser beam 303 comprises characteristics (e.g., a pulse width, repetition rate, amplitude) depending on a modulation signal provided thereto. In embodiments, the particular configuration of the laser beam source 302 may depend on the configuration of the solid state optical deflector 204. For example certain electro-optical deflectors (e.g., constructed of KTN) may have lower damage thresholds than other types of solid state optical deflectors, and require the continuous wave laser beam 303 to have a lower intensity.

Figure 3B:
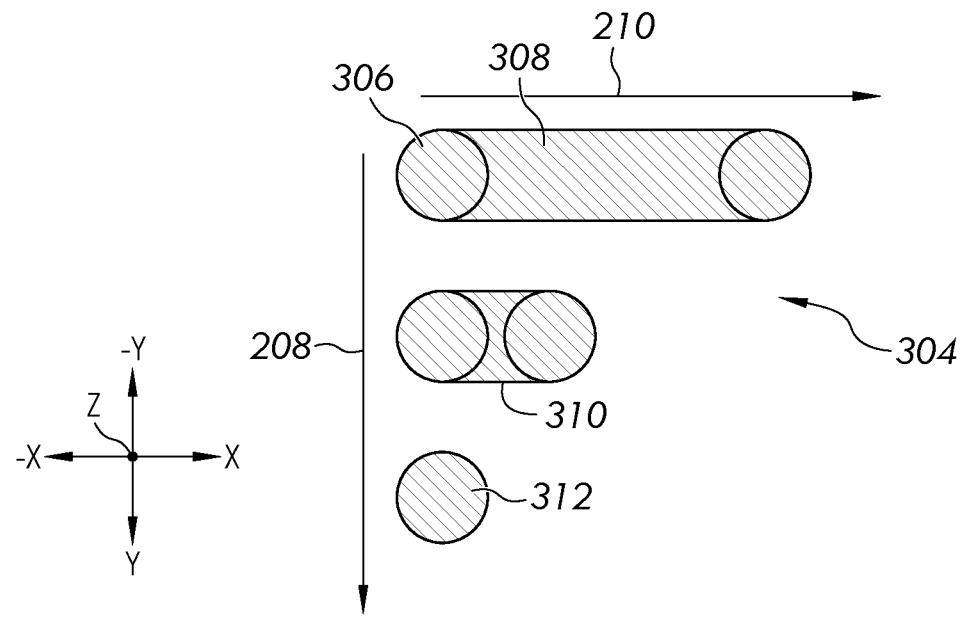
FIG. 3B schematically depicts a plurality of positions of incidence of a laser beam on a build platform of an additive manufacturing apparatus obtained via the scanning assembly depicted in FIG. 3A, according to one or more embodiments described herein.

Referring now to FIG. 3B, a plurality of one-dimensional scanning patterns 304 in the plane of the build platform 144 provided by the scanning assembly 300 is shown. The plurality of one-dimensional scanning patterns 304 may be produced by using the solid state optical deflector 204 to modulate the impingement location of the continuous wave laser beam 303 in the secondary scan direction 210 at the secondary scan rate. The relatively small time scale over which each one-dimensional scanning pattern is formed as compared to the primary scan rate of the primary scanning element 206 permits flexibility in terms of the geometry of the melt pool formed during each scanning interval. As depicted in FIG. 3B, the plurality of one-dimensional scanning patterns 304 comprises a first scanning pattern 308, a second scanning pattern 310, and the third scanning pattern 312. The first, second, and third scanning patterns 308, 310, and 312 vary from one another in length in the secondary scanning direction 210. For example, the change in magnitude of the control signal provided to the solid state optical deflector 204 may be modified in producing each of the plurality of one-dimensional scanning patterns 304 to create a desired pattern extending along the primary scanning direction 208.

To generate the first scanning pattern 308, a beam spot 306 of the continuous wave laser beam 303 is moved in the secondary scanning direction 210 by providing a first control signal (e.g., a linearly increasing voltage in the case of the electro-optical deflector) to the solid state optical deflector 204. To generate the second scanning pattern 310, a second control signal that is shorter in duration than the first control signal may be provided to the solid state optical deflector 204. To generate the third scanning pattern 312, the impingement location of a beam spot may not be modulated via the solid state optical deflector 204. Thus, by providing control signals of varying shape and amplitude to the solid state optical deflector 204, various sub-patterns may be scanned on the layer of powder depending on the portion of the object 153 being built. The solid state optical deflector 204 thus allows fine-tuning of the build process.

Figure 4A:
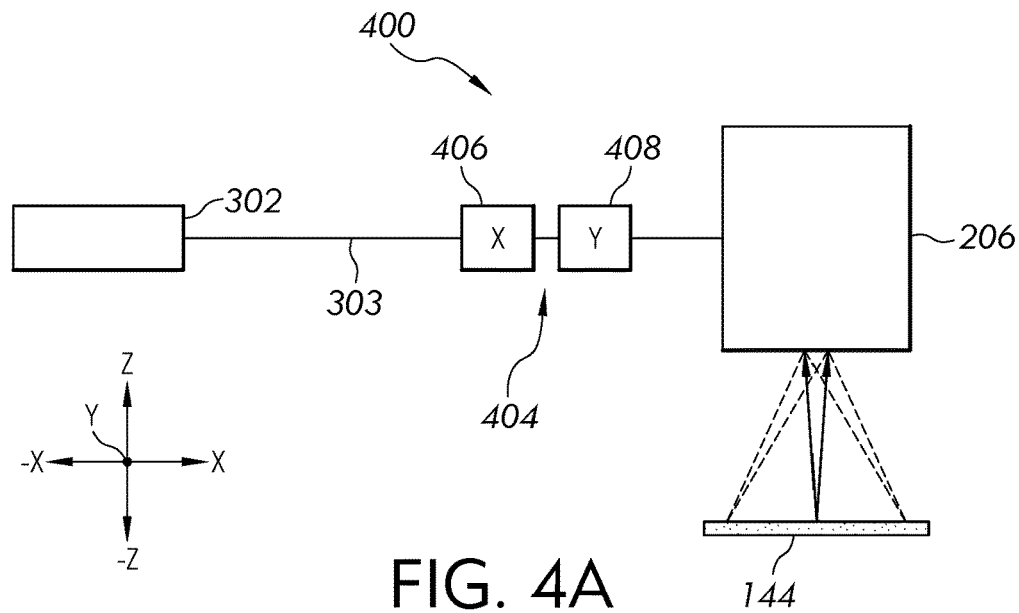
FIG. 4A schematically depicts a scanning assembly comprising a solid state optical deflector and laser beam source for an additive manufacturing apparatus, according to one or more embodiments described herein.

FIG. 4A schematically depicts an example implementation of a scanning assembly 400 and the laser beam source 302 described with respect to FIG. 3A. In embodiments, the scanning assembly 400 and the laser beam source 302 may be used in place of the laser beam source 150 and the scanning assembly 160 of the additive manufacturing apparatus 140 described herein with respect to FIG. 1. The scanning assembly 400 may be similar in structure to the scanning assembly 300 described herein with respect to FIG. 3A. Accordingly, like reference numerals may be used in the description of FIG. 4A to indicate the incorporation of such like components. The scanning assembly 400 differs from the scanning assembly 300 depicted in FIG. 3A in that the solid state optical deflector 404 comprises a multi-directional solid state optical deflector.

The solid state optical deflector 404 comprises a first solid state optical deflector 406 that modulates a propagation direction of the continuous wave laser beam 303 in a first direction (e.g., the X-direction depicted in FIG. 4A) and a second solid state optical deflector 408 that modulates a propagation direction of the continuous wave laser beam 303 in a second direction that is different from the first direction (e.g., the Y-direction depicted in FIG. 4A). The first and second solid state optical deflectors 406 and 408 may be acousto-optical deflectors, electro-optical deflectors, or any combination thereof. While the depicted embodiment includes first and second solid state optical deflectors 406 and 408 that are separate components, it should be understood that embodiments are envisioned where the first and second solid state optical deflectors 406 and 408 are integrated into a single component. For example, in embodiments, the solid state optical deflector 404 is an electro-optical deflector comprising two pairs of electrodes extending in different directions relative to a body of optically transparent material, and separate control signals may be provided to each pair to electrodes to modulate the propagation direction of the continuous wave laser beam 303 in different directions.

Figure 4B:
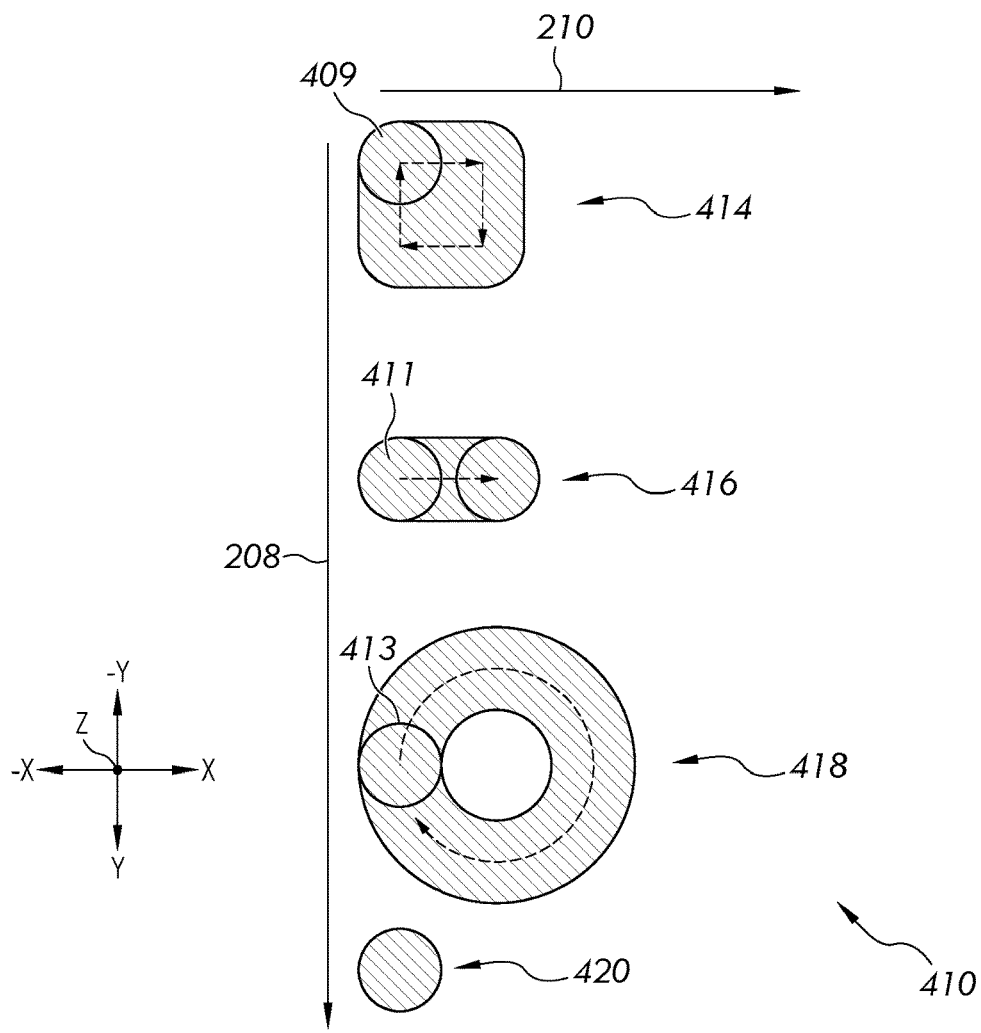
FIG. 4B schematically depicts a plurality of positions of incidence of a laser beam on a build platform of an additive manufacturing apparatus obtained via the scanning assembly depicted in FIG. 4A, according to one or more embodiments described herein.

The solid state optical deflector 404 permits manipulation of the impingement location of the continuous wave laser beam 303 in a plurality of different two-dimensional patterns during movement in the primary scanning direction 208. For example, FIG. 4B depicts a plurality of two-dimensional patterns 410 that may be formed by the solid state optical deflector 404 as the continuous wave laser beam 303 is scanned in the primary scanning direction 208. It should be understood that the patterns depicted in FIG. 4B are exemplary only and that patterns having other shapes (e.g., m-shaped, v-shaped, L-shaped, lemniscate-shaped, s-shaped, half circle-shaped, and any other suitable shape) may be formed via the solid state optical deflector 404. The plurality of two-dimensional patterns 410 are formed in the plane of the build platform 144 (e.g., within a layer of powder disposed thereon). In embodiments, the plurality of two-dimensional patterns 410 may be formed when the solid state optical deflector 404 facilitates re-direction of the continuous wave laser beam 303 in a first direction that is perpendicular to the primary scanning direction 208 (e.g., the secondary scanning direction 210) and a second direction that is parallel to the primary scanning direction 208. For example, the first solid state optical deflector 406 may modulate a propagation direction of the continuous wave laser beam 303 in the secondary scanning direction 210, while the second solid state optical deflector 408 may modulate the propagation direction along the primary scanning direction 208. By simultaneously modulating the propagation direction of the continuous wave laser beam 303 in both of such directions in varying amounts, various two-dimensional patterns (e.g., sub-patterns) may be formed in the layer of powder.

A first two-dimensional pattern 414 of the plurality of two-dimensional patterns 410 is a substantially square-shaped pattern where a first beam spot 409 of the continuous wave laser beam 303 is directed in segments extending along the primary and secondary scanning directions 208 and 210 (and opposites thereof) by the solid state optical deflector 404. In embodiments, to generate the first two-dimensional pattern 414, the first and second solid state optical deflectors 406 and 408 may sequentially modulate the propagation direction of the continuous wave laser beam 303. For example, a first increasing voltage signal may initially be applied to the first solid state optical deflector 406 to deflect the first beam spot 409 along the secondary scanning direction 210 by an amount that increases in time to form a first portion of the first two-dimensional pattern 414. The voltage on the first solid state optical deflector 406 may then be held constant while a similar, second increasing voltage signal is applied to second solid state optical deflector 408 to deflect the first beam spot 409 along the primary scanning direction 208. The voltages on the first and second solid state optical deflectors 406 and 408 may then be sequentially decreased to form the remaining segments. Thus, as exemplified by the first two-dimensional pattern 414, by adjusting the relative length in time, magnitude, and phasing of the control signals provided sequentially to the first and second solid state optical deflectors 406 and 408, patterns of a variety of different sizes and shapes may be formed.

In embodiments, movement of the continuous wave laser beam 303 (e.g., via either the solid state optical deflector 204 described with respect to FIGS. 2A and 3A or the solid state optical deflector 404 depicted in FIG. 4A) during scanning may be used to generate a desired intensity distribution during a particular scanning interval. Movement of the continuous wave laser beam 303 via the solid state optical deflector 404 facilitates quasi-static adjustment of the energy density profile with which energy is provided to the powder material. Movement of the continuous wave laser beam 302 in the two-dimensional patterns described herein may be used to pre-heat the particulate material prior to melting in order to control thermal gradients within the particulate material and avoid unwanted residual stress accumulations. Additionally, the solid state optical deflector 404 may also form any of two-dimensional patterns described herein after melting of the particulate material to, for example, control the viscosity of the melted material and control the grain structure of the melted material. In embodiments, the continuous wave laser beam 302 may be moved in any of the two-dimensional patterns described herein during the process of melting the particulate material to form a melt-pool having a desired shape. Any of the two-dimensional patterns described herein may be used before, during, or after formation of a melt pool in the particulate material (e.g., based on the scanning rate with which the continuous wave laser beam 302 is moved over the particulate material) to improve the overall build process.

Referring still to FIG. 4B, a second two-dimensional pattern 416 is a linearly-shaped pattern where a second beam spot 411 of the continuous wave laser beam 303 is directed in the secondary scanning direction 210 by the solid state optical deflector 404. In forming the second two-dimensional pattern 416, for example, the second solid state optical deflector 408 may not modulate the propagation direction of the continuous wave laser beam 303 such that the second two-dimensional pattern 416 corresponds to one of the plurality of one-dimensional scanning patterns 304 described with respect to FIG. 3B. A third two-dimensional pattern 418 is a substantially circle-shaped pattern where a third beam spot 413 of the continuous wave laser beam 303 is simultaneously re-directed using both the first and second solid state optical deflectors 406 and 408. Deflection amounts by the first and second solid state optical deflectors 406 and 408 are varied with time such that the third beam spot 413 is directed in a ring-like manner as the continuous wave laser beam 303 is scanned in the primary scanning direction 208. A fourth two-dimensional pattern 420 may result when the solid state optical deflector 404 does not modulate the propagation direction of the continuous wave laser beam 303. That is, the fourth two-dimensional pattern 420 may correspond to a single beam spot. In embodiments, depending on the intensity of the continuous wave laser beam 303 at the build platform 144, the fourth two-dimensional pattern 420 may be used to melt the particulate material disposed thereon, and any of the plurality of two-dimensional patterns 410 (or two-dimensional patterns having other shapes) may be used for performing heat treatments before or after melt pool formation.

As exemplified by the plurality of two-dimensional patterns 410 depicted in FIG. 4B, the solid state optical deflector 404 may be used to tailor distributions of energy provided to the layer of powder material depending on the location of the object 153 being built. That is, the particular shape of the energy distribution being provided to the powder may be quickly tailored in accordance with the requirements of the object being built to enhance efficiencies in the additive manufacturing process. The solid state optical deflector 404 provides enhanced flexibility over conventional mechanical-based scanners by allowing the particular distribution of energy provided to the powder material per scanning interval to be updated over the course of a scan. For example, along a single scan line of the primary scanning element 206, the continuous wave laser beam 303 may be scanned in a plurality of different two-dimensional patterns, depending on characteristics of the layer of the object being constructed. To illustrate, along a particular scan line of the primary scanning element 206, the length of the second two-dimensional pattern 416 may vary to form melt pools of varying width.

Figure 5A:
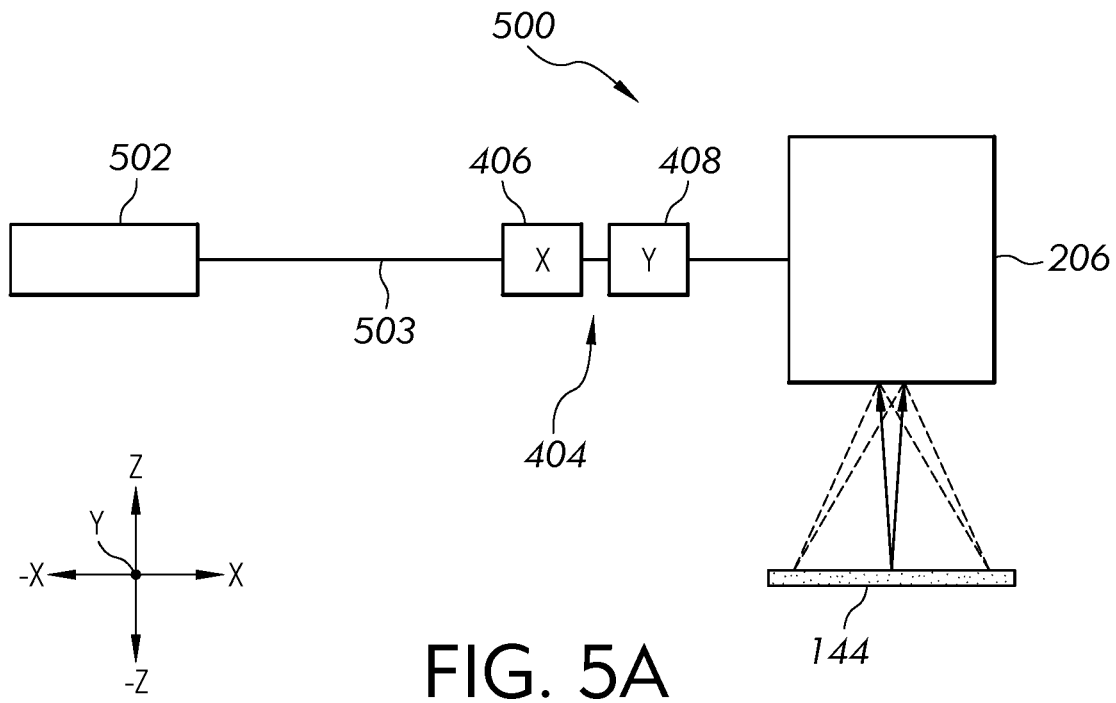
FIG. 5A schematically depicts a scanning assembly comprising a solid state optical deflector and laser beam source for an additive manufacturing apparatus, according to one or more embodiments described herein.

FIG. 5A schematically depicts an example implementation of a scanning assembly 500 and a laser beam source 502. In embodiments, the scanning assembly 500 and the laser beam source 502 may be used in place of the laser beam source 150 and the scanning assembly 160 of the additive manufacturing apparatus 140 described herein with respect to FIG. 1. The scanning assembly 500 may be similar in structure to the scanning assembly 400 described herein with respect to FIG. 4A. Accordingly, like reference numerals may be used in the description of FIG. 5A to indicate the incorporation of such like components. In embodiments, the laser beam source 502 may be a pulsed laser beam source or a continuous laser beam source.

Figure 5B:
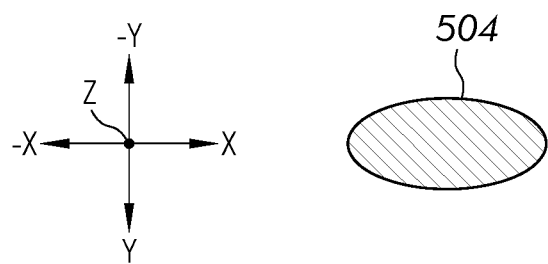
FIG. 5B schematically depicts a distorted beam spot of a laser beam that may occur at off-axis scanning angles of the scanning assembly depicted in FIG. 5A, according to one or more embodiments described herein.

In embodiments, scanning of the laser beam 503 at relatively large angles (e.g., off the central axis 172 of the additive manufacturing apparatus 140, see FIG. 1) via the primary scanning element 206 may cause distortions of the laser beam 503. That is, the beam shape of the laser beam 503 may vary as a function of scanning angle of the primary scanning element 206. For example, FIG. 5B depicts an elliptical beam spot 504 that may result from the primary scanning element 206 directing the laser beam 503 off a central axis. Such an elliptical beam spot 504 may have a shape that varies depending on the angle of incidence of the laser beam 503 on the build platform 144. Due to such effects, the laser beam 503 may possess a directionally-dependent beam shape, creating various difficulties in the build process.

In embodiments, the solid state optical deflector 404 may be used to correct such directionally-dependent effects in order to provide a more consistent laser beam spot size over the entire build platform 144, irrespective of scanning angle. For example, in embodiments, the solid state optical deflector may modulate the laser beam 503 in a directionally dependent two-dimensional pattern (e.g., similar to the third two-dimensional pattern 418 described with respect to FIG. 4B) such that the beam spot has a similar size and shape irrespective of angle of incidence on the build platform 144. In embodiments, depending on an estimated size and energy distribution of the laser beam 503 at a particular location on the build platform 144 (e.g., based on the scanning angle of the primary scanning element 206), the solid state optical deflector 404 may modulate the propagation direction of the laser beam 503 in a different two-dimensional pattern. At relatively low scanning angles (e.g., near a central axis of the scanning assembly 400), for example, the laser beam 503 may be focused to a minimum spot size and have a substantially circular shape, and the solid state optical deflector 404 may be controlled to form a two dimensional pattern such that the laser beam 503 is directed in a circular pattern to form a spot size that is larger than the minimum spot size. At relatively larger scanning angles, to counteract the elliptical beam shape depicted in FIG. 5B, the solid state optical deflector 404 may be controlled to form the same circular pattern as at the lower scanning angles, with the understanding that the deflection amounts provided via the solid state optical deflector 404 in various directions may vary as compared to at the lower scanning angles. By varying the deflection pattern of the solid state optical deflector 404 as a function of scanning direction of the primary scanning element 206, a consistent energy distribution (e.g., consistent in both shape and size) may be provided to build material on the build platform 144.

In embodiments, the solid state optical deflector 404 may distort or focus the laser beam 503 output by the laser beam source 502 depending on the control signal being provided thereto. For example, if the solid state optical deflector 404 includes an acousto-optical deflector, the shape of the laser beam 503 may vary as a function of scanning speed induced by the solid state optical deflector 404. Acousto-optical deflectors are known to induce a cylindrical lensing effect that varies as a function of scan rate. Electro-optical deflectors are known to induce a similar cylindrical lensing effect dependent on the voltage provided to the electrodes associated therewith. In embodiments, the inherent cylindrical lensing of the solid state optical deflector 404 may be used to counteract such directionally-dependent beam shapes of the laser beam 503 caused by the primary scanning element. In embodiments, such cylindrical lensing effects may be used in combination with varying deflection patterns to generate spatially uniform energy distributions across the entirety of the build platform 144.

Figure 6A:
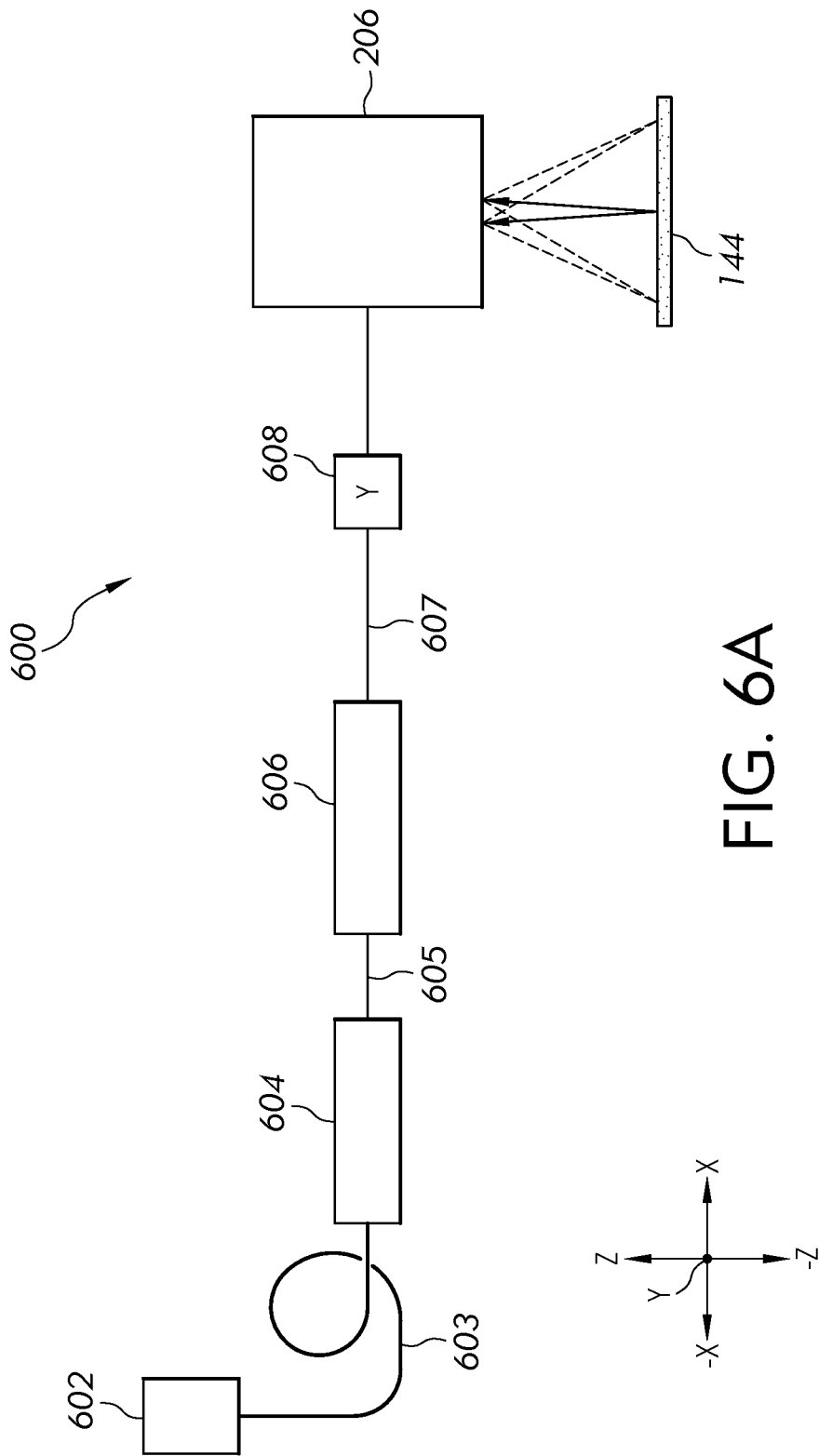
FIG. 6A schematically depicts a scanning assembly comprising a solid state optical deflector and laser beam source for an additive manufacturing apparatus, according to one or more embodiments described herein.

FIG. 6A schematically depicts an example implementation of a scanning assembly 600 and a laser beam source 602. In embodiments, the scanning assembly 600 and the laser beam source 602 may be used in place of the laser beam source 150 and the scanning assembly 160 of the additive manufacturing apparatus 140 described herein with respect to FIG. 1. In embodiments, the laser beam source 602 is a modulated laser beam source generating a laser beam that is modulated at a first frequency $f_1$. In embodiments, the first frequency $f_1$ is less than or equal to 50 kHz. The scanning assembly 600 is depicted to include a fiber connector and collimator 604, an optical switching unit 606, a solid state optical deflector 608, and the primary scanning element 206 described herein with respect to FIG. 2A. The fiber connector and collimator 604 may receive a laser beam from an optical fiber 603 at an output of the laser beam source 602 and generate a collimated laser beam 605 for transmission to a remainder of the components to the scanning assembly 600.

The optical switching unit 606 may modulate the collimated laser beam 605 at a second frequency $f_2$. In embodiments, the second frequency $f_2$ is greater than or equal to the first frequency $f_1$. In embodiments, the second frequency $f_2$ is less than or equal to 10 MHz. In embodiments, the optical switching unit 606 is an ultrafast optical switch diverting portions of the collimated laser beam 605 away from an optical axis of the scanning assembly 600 such that a pulsed laser beam 607 is incident on a solid state optical deflector 608 of the scanning assembly 600. The pulsed laser beam 607 may have a pulse repetition rate that corresponds to the second frequency $f_2$. In embodiments, the optical switching unit 606 comprises an acousto-optic deflector or an acousto-optical modulator. In embodiments, the optical switching unit 606 comprises a linear electro-optical deflector (e.g., a Pockels effect deflector). In the absence of modulation via the optical switching unit 606, the collimated laser beam 605 may be incident on the build platform 144 with a modulation frequency (e.g., pulse repetition rate) corresponding to the first frequency $f_1$.

Figure 6B:
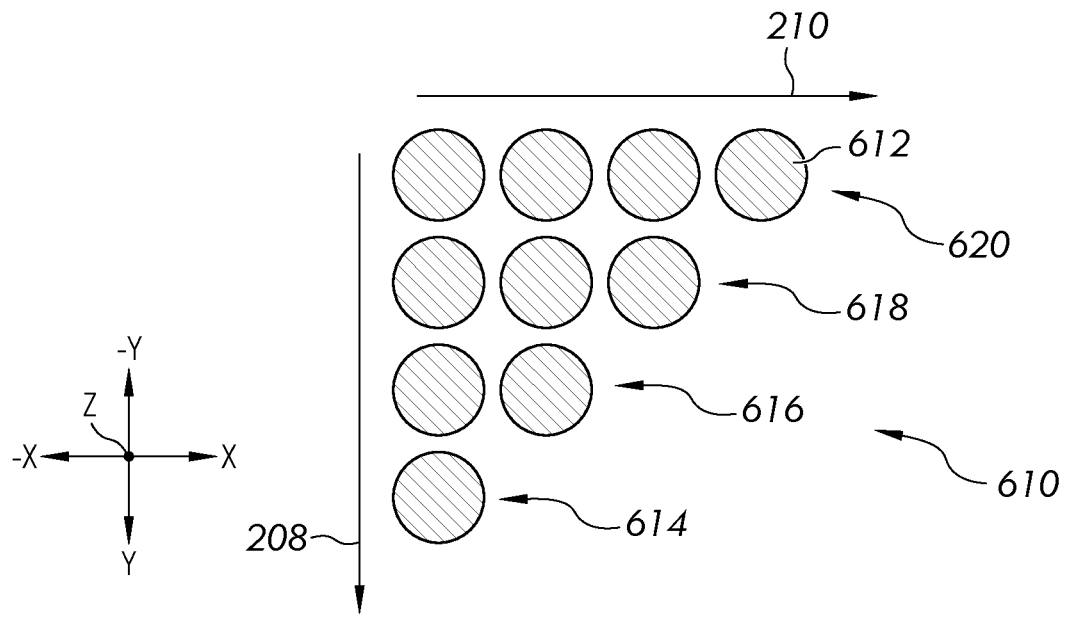
FIG. 6B schematically depicts a plurality of positions of incidence of a laser beam on a build platform of an additive manufacturing apparatus obtained via the scanning assembly depicted in FIG. 6A, according to one or more embodiments described herein.

The solid state optical deflector 608 may function in a similar manner to the solid state optical deflector 204 described herein with respect to FIG. 2A. For example, as depicted in FIG. 6B, as the primary scanning element 206 is scanning the pulsed laser beam 607 in the primary scanning direction 208, the solid state optical deflector 608 may modulate the pulsed laser beam 607 in the secondary scanning direction 210 at a rate greater than the pulse frequency multiplied by the spot size of the pulsed laser beam 607 at the build platform 144 such that beam spots 612 of subsequent pulses of the pulsed laser beam 607 are separated from one another in the secondary scanning direction 210. The effect of this is generate a plurality of separate scan lines 614, 616, 618, and 620 extending in the primary scanning direction 208. That is, for each separate scan line of the primary scanning element 206, a plurality of parallel scanning lines are formed in the build material. Such pulse separation thus facilitates build process parallelization and increased build efficiency.

As depicted in FIG. 6B, in embodiments, the solid state optical deflector 608 modulates the pulsed laser beam 607 in the secondary scanning direction 210 such that successive pulses of beam spots 622 of the pulsed laser beam 607 overlap one another. The effect of such deflection by the solid state optical deflector 608 is to form a plurality of melt pools 624, 626, 628, and 628 that vary in shape along the primary scanning direction 208. The amount of modulation by the solid state optical deflector 608 may vary along the primary scanning direction 208 to fuse differing amounts of build material along a scan line of the primary scanning element 206. The solid state optical deflector 608 thus facilitates either parallelization of the build process (e.g., fusing separate portions of build material along the same scan line) during scanning via the primary scanning element 206 or generation of melt pools that are tailored along scan lines depending on the portion of the object being constructed.

Figure 7A:
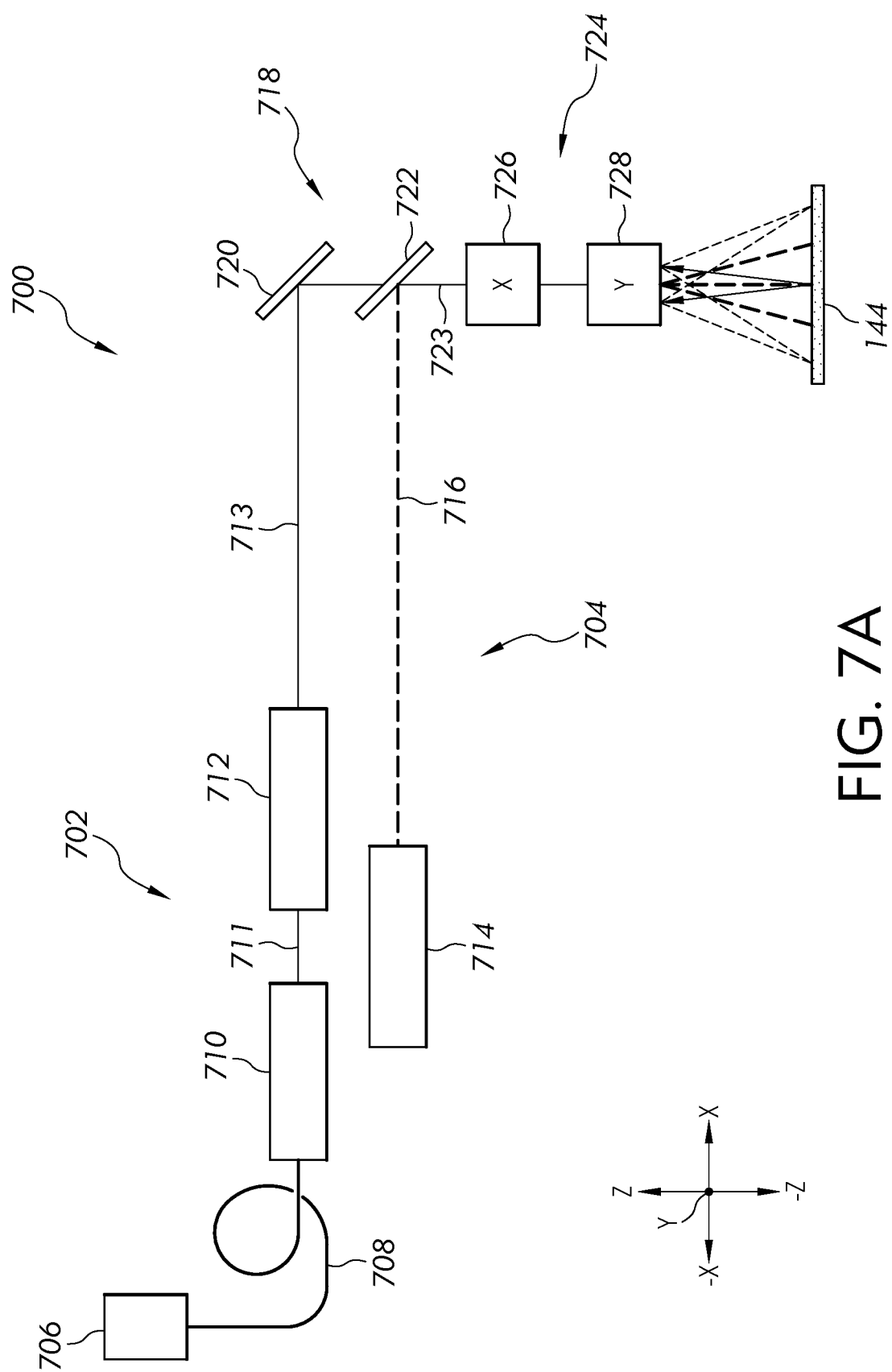
FIG. 7A schematically depicts a scanning assembly comprising a solid state optical deflector, a pulsed laser beam source, and a continuous wave laser beam source for an additive manufacturing apparatus, according to one or more embodiments described herein.

FIG. 7A schematically depicts another example scanning assembly 700. In embodiments, the scanning assembly 700 may be used in place of the laser beam source 150 and the scanning assembly 160 of the additive manufacturing apparatus 140 described herein with respect to FIG. 1. The scanning assembly 700 comprises at least one a solid state optical deflector 724. Unlike in the preceding examples, the scanning assembly 700 does not include a scanning element in addition to the solid state optical deflector 724. The solid state optical deflector 724 is used as a standalone scanning device. Solid state optical deflectors may have a relatively low profile as compared to other types of scanning systems, because they do not require external motors or the like. As such, the scanning assembly 700 may be more compact than the other scanning assemblies described herein. The maximum deflection angle of the scanning assembly 700 may be less than scanning assemblies incorporating an additional scanning element, as acousto-optic or electro-optic deflectors typically have more limited apertures and maximum deflection angles than conventional, mechanical scanning devices. Given this, to facilitate forming objects of comparable size to the other scanning assemblies described herein, the scanning assembly 700 may be movable relative to the build platform 144 to place various regions of the build platform 144 within view of the scanning assembly 700. For example, in embodiments, the build platform 144 is placed on a translation stage or other suitable actuator to facilitate relative motion of the build platform 144 and the scanning assembly. In embodiments, the scanning assembly 700 is attached to an actuator (e.g., a gantry system, an articulating robotic arm, or the like) to provide such relative movement.

The scanning assembly is shown to include a first laser beam path 702 comprising continuous wave laser beam source 706 and a second laser beam path 704 comprising a pulsed laser beam source 714. While FIG. 7 depicts that the scanning assembly 700 comprises both the continuous wave laser beam source 706 and the pulsed laser beam source 714, it should be appreciated that embodiments may include only a single laser beam source (e.g., either the continuous wave laser beam source 706 or the pulsed laser beam source 714). Embodiments omitting either the continuous wave laser beam source 706 or the pulsed laser beam source 714 may further omit the additional elements of the first and second laser beam paths 702 and 704.

In the depicted embodiment, the first laser beam path 702 comprises the continuous wave laser beam source 706, a delivery fiber 708, a fiber connector and collimator 710, and an optical switching element 712. In embodiments, the first laser beam path 702 operates in a similar manner as described in connection with the laser beam source 602 described herein with respect to FIG. 6A, in which the fiber connector an collimator 710 generates a collimated continuous wave laser beam 711 that is converted to a pulsed laser beam 713 via the optical switching element 712. Conversion of the collimated continuous wave laser beam 711 to the pulsed laser beam 713 via the optical switching element 712 facilitates use of the solid state optical deflector 724 by preventing damage thereto. The pulsed laser beam 713 may be directed to the build platform 144 and the solid state optical deflector 724 via a beam combiner 718.

The second laser beam path 704 comprises a pulsed laser beam source 714 (e.g., comprising a MOFA or MOPA laser beam source) generating a pulsed laser beam 716. The pulsed laser beam 716 is directed towards the solid state optical deflector 724 via the beam combiner 718. The beam combiner 718 is depicted to include a reflector 720 positioned to direct the pulsed laser beam 713 from the first laser beam path 702 towards the solid state optical deflector 724. The beam combiner 718 further includes an additional deflector 722 positioned to direct the pulsed laser beam 716 towards the solid state optical deflector 724 and generate a combined laser beam 723. The combined laser beam 723 may provide additional power than any of the individual pulsed laser beam 713 and 716.

By incorporating multiple laser beam sources, the scanning assembly 700 provides an additional level of flexibility, as the laser beam sources 706 and 714 may be selectively used to tailor the combined laser beam 723 in terms of average power and/or beam shape. In embodiments, a first one of the laser beam sources of the scanning assembly 700 (e.g., the continuous wave laser beam source 706) may be used to pre-heat the particulate material (or perform heat treatments on melted particulate material), while another one of the laser beam sources of the scanning assembly 700 may be used to melt the particulate material after the pre-heating. In embodiments, one of the laser beam sources (e.g., the continuous wave laser beam source 706) may be used to fill gaps between pulses of the other laser beam source (e.g., the pulsed laser beam source 714). It should be appreciated that, in embodiments, the scanning assembly 700 may include only a single laser beam source and the first laser beam path 702 or the second laser beam path 704 may be omitted.

The solid state optical deflector 724 comprises a first solid state optical deflector 726 that modulates a propagation direction of the combined laser beam 723 in a first direction (e.g., the X-direction depicted in FIG. 7A) and a second solid state optical deflector 728 that modulates a propagation direction of the combined laser beam 723 in a second direction that is different from the first direction (e.g., the Y-direction depicted in FIG. 7A). The first and second solid state optical deflectors 726 and 728 may be acousto-optical deflectors, electro-optical deflectors, or any combination thereof. While the depicted embodiment includes first and second solid state optical deflectors 726 and 728 that are separate components, it should be understood that embodiments are envisioned where the first and second solid state optical deflectors 726 and 728 are integrated into a single component. For example, in embodiments, the solid state optical deflector 724 is an electro-optical deflector comprising two pairs of electrodes extending in different directions relative to a body of optically transparent material, and separate control signals may be provided to each pair to electrodes to modulate the propagation direction of the combined laser beam 723 in different directions.

The multiple laser beam sources of the scanning assembly 700 in combination with the solid state optical deflector 724 permits flexibility in terms of the energy provided to the build platform 144. For example, in embodiments, when only the first laser beam path 702 is used, the solid state optical deflector 726 may permit manipulation of the combined laser beam 723 in a plurality of two-dimensional patterns at various locations on the build platform. The two-dimensional patterns may be similar to the plurality of two-dimensional patterns 410 described herein with respect to FIG. 4B. The first and second solid state optical deflectors 726 and 728 may be used to manipulate the propagation direction of the combined laser beam 723 in any number of different two-dimensional patterns over the surface of the build platform 144 to facilitate forming melt pools having shapes that are tailored to the cross-section of the object being formed.

Figure 6C:
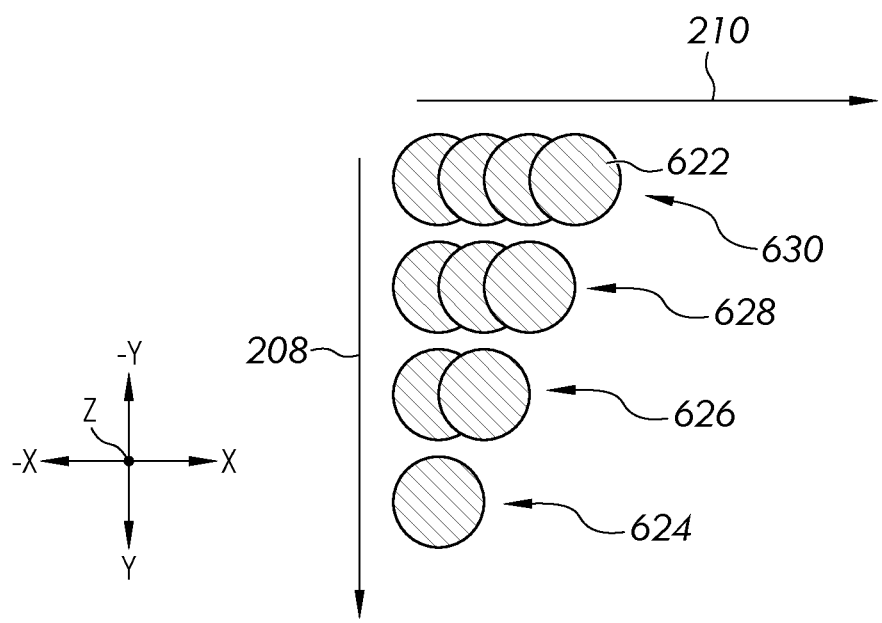
FIG. 6C schematically depicts a plurality of positions of incidence of a laser beam on a build platform of an additive manufacturing apparatus obtained via the scanning assembly depicted in FIG. 6A, according to one or more embodiments described herein.
Figure 7B:
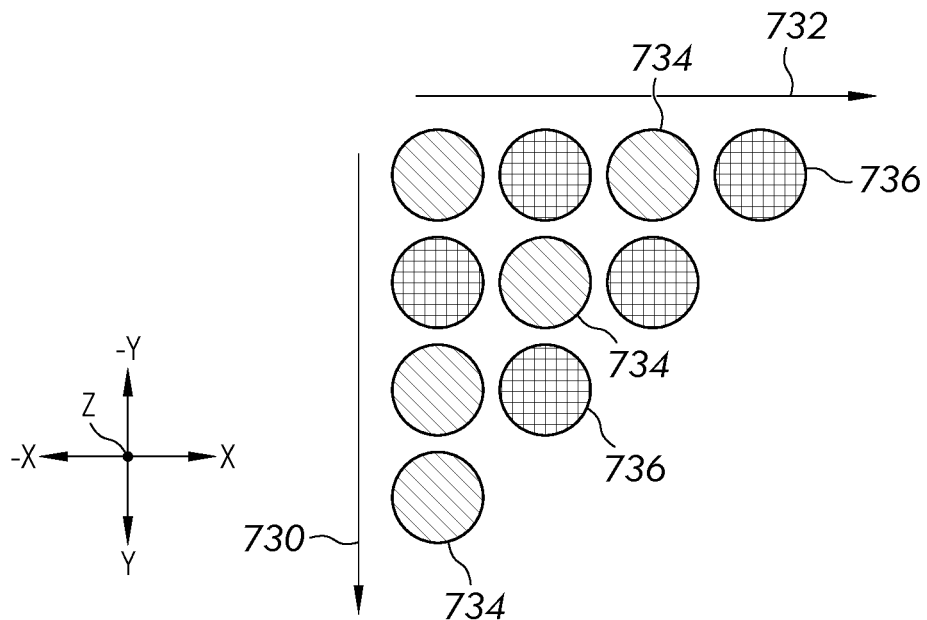
FIG. 7B schematically depicts a plurality of positions of incidence of a laser beam on a build platform of an additive manufacturing apparatus obtained via the scanning assembly depicted in FIG. 7A, according to one or more embodiments described herein.
Figure 7C:
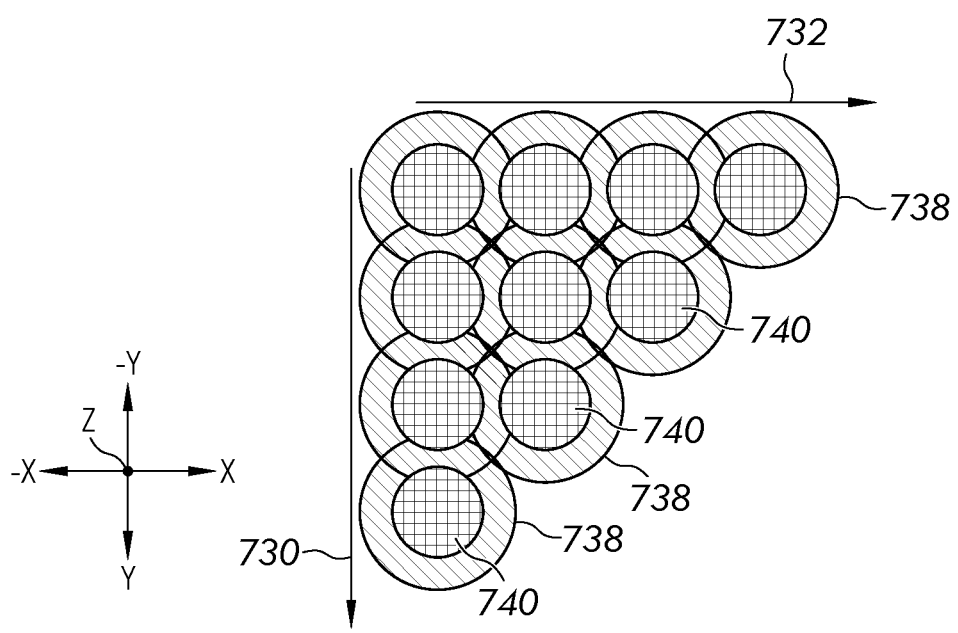
FIG. 7C schematically depicts a plurality of positions of incidence of a laser beam on a build platform of an additive manufacturing apparatus obtained via the scanning assembly depicted in FIG. 7A, according to one or more embodiments described herein.

In another example, when used in combination with the pulsed laser beam 716 from the second laser beam path 704. The solid state optical deflector 724 may facilitate build process parallelization in a manner similar to that described with respect to FIG. 6C. For example, as depicted in FIG. 7B, in embodiments, one of the first and second solid state optical deflectors 726 and 728 may be controlled to scan the combined laser beam 723 along a first scan direction 730 at a scanning rate that is sufficiently low such that the combined laser beam 723 melts build material along the first scan direction 730. The other one of the first and second solid state optical deflectors 726 and 728 may be controlled to scan the combined laser beam 723 along a second scan direction 732 at a higher rate so as to facilitate separation of successive beam spots 734, 736 of the combined laser beam 723 in the second scan direction 732 (e.g., a plurality of successive first beam spots 734 may originate from the continuous wave laser beam source 706 and a plurality of successive second beam spots 736 may originate from the pulsed laser beam source 714). In this way, the solid state optical deflector 724 may provide build process parallelization in a manner similar to the scanning assembly 600 described herein with respect to FIG. 6B. The scanning speeds in which the combined laser beam 723 is manipulated in the first and second scan directions 730 and 732 may be set to any suitable combination to provide any desired energy distribution to the build platform. For example, in embodiments, the scanning speed along the second scan direction 732 may be reduced as compared to the example depicted in FIG. 7B so as to provide the melt pool customization described herein with respect to FIG. 6C. As depicted in FIG. 7C, for example, a plurality of successive second beam spots 740 (e.g., originating from the pulsed laser beam source 714) may overlap with a plurality of successive first beam spots 738 (e.g., originating from the continuous wave laser beam source 706) to provide melt pool customization.

It should be understood that the embodiments described herein may include any number of solid state optical deflectors (e.g., 3 or more, 4 or more, etc.) capable of manipulating a propagation direction of a laser beam in any combination of directions. Moreover, the solid state optical deflectors described herein may be combined with any known technique to manipulate a propagation direction of a laser beam (e.g., translating optical elements, diffractive optical elements, spatial light modulators, and the like) to form a scanning assembly of an additive manufacturing apparatus.

In view of the foregoing description, it should be appreciated that incorporating at least one solid state optical deflector into a scanning assembly of an additive manufacturing apparatus improves the build process in various ways. For example, solid state optical deflectors permit movement of laser beams over the build platform at rates previously unobtainable through conventional mechanical scanners. Such increased scanning rates allow permit the utilization of high average power pulsed laser beams while avoiding vaporization of the build material. Moreover, the propagation direction of the laser beam can be manipulated in various patterns to overcome various defects associated with conventional scanning assemblies, such as uneven energy distributions or directionally-dependent beam shapes. The ultrafast deflection provided by the solid state optical deflectors described herein may facilitate control of temperature fields within the particulate material (e.g., by perform pre-melting and post-melting heat treatments of the melt pool and areas surrounding the melt pool) to prevent unwanted residual stress accumulation and improve quality of produced parts. Build processes can also be parallelized and melt pools that are particularly tailored to a location on the object being built can be generated. As such, utilization of the solid state optical deflectors as described herein improves the build processes of additive manufacturing apparatuses both in terms of build efficiency and quality.

Further aspects of the invention are provided by the subject matter in the following clauses:

1. An additive manufacturing apparatus comprising:
   a laser beam source emitting a laser beam;
   a build platform;
   a powder source depositing a layer of powder onto the build platform; and
   a scanning assembly disposed along an optical path between the laser beam source and the build platform, the scanning assembly comprising at least one solid state optical deflector that modifies at least one of a size or an impingement location of the laser beam on the layer of powder at a scanning position of the laser beam.

2. The additive manufacturing apparatus of any preceding clause, wherein at least one of:
   the laser beam source is a pulsed laser beam source; and
   the additive manufacturing apparatus further comprises an optical switching unit disposed between the laser beam source and the scanning assembly, the optical switching unit converting the laser beam to a pulsed laser beam.

3. The additive manufacturing apparatus of any preceding clause, wherein the solid state optical deflector modifies the impingement location between pulses of the laser beam to modify a distribution of energy provided by the laser beam to the layer of powder.

4. The additive manufacturing apparatus of any preceding clause, wherein the impingement location is modified between successive pulses in an amount that is less than or equal to a spot size of the laser beam at the impingement location such that the successive pulses overlap one another to form an enlarged melt pool in the layer of powder.

5. The additive manufacturing apparatus of any preceding clause, wherein the impingement location is modified between successive pulses in an amount that is greater than a spot size of the laser beam at the impingement location such that the successive pulses do not overlap one another and each pulse forms a separate melt pool in the layer of powder.

6. The additive manufacturing apparatus of any preceding clause, wherein the solid state optical deflector is configured to modulate the impingement location of the laser beam on the build platform at a maximal angular velocity that is faster than at least one of a pulse duration associated with the laser beam or a primary rate at which the laser beam is scanned in a primary scanning direction on the build platform, the primary rate being determined by at least one of relative motion between the build platform and the laser beam source or an additional scanning element of the scanning assembly.

7. The additive manufacturing apparatus of any preceding clause, wherein the solid state optical deflector modulates the impingement location of the laser beam on the build platform in a direction that differs from the primary scanning direction.

8. The additive manufacturing apparatus of any preceding clause, wherein:
   the solid state optical deflector is a two-dimensional deflector comprising a first solid state optical deflector and a second solid state optical deflector, the first and second solid state optical deflectors configured to modulate a propagation direction of the laser beam in different directions; and
   the modulation of the impingement location in the direction that differs from the primary scanning direction occurs in a predetermined pattern such that the predetermined pattern is scanned in the primary scanning direction.

9. The additive manufacturing apparatus of any preceding clause, wherein the modulation of the impingement location of the laser beam on the build platform in the direction that differs from the primary scanning direction applies heat to the layer of powder either before the powder is melted or after the powder is melted in a predetermined pattern.

10. The additive manufacturing apparatus of any preceding clause, wherein:
    the additional scanning element comprises a mirror-based scanning element scanning the laser beam along the primary scanning direction at a first angular velocity; and
    the solid state optical deflector modulates the impingement location of the laser beam at a second angular velocity that is greater than the first angular velocity.

11. An additive manufacturing apparatus comprising:
    a laser beam source emitting a laser beam;
    a build platform;
    a powder source depositing a layer of powder onto the build platform;
    a solid state optical deflector that modulates a propagation direction of the laser beam at an angular velocity; and
    an optical assembly that conditions the laser beam prior to the laser beam being incident on the layer of powder.

12. The additive manufacturing apparatus of any preceding clause, wherein at least one of:
    the laser beam source is a pulsed laser beam source; and
    the additive manufacturing apparatus further comprises an optical switching unit disposed between the laser beam source and the scanning assembly, the optical switching unit converting the laser beam to a pulsed laser beam.

13. The additive manufacturing apparatus of any preceding clause, wherein the pulsed laser beam source comprises a master oscillator power amplifier or a master oscillator fiber amplifier.

14. The additive manufacturing apparatus of any preceding clause, wherein the solid state optical deflector modifies an impingement location of the laser beam on the layer of powder between pulses of the laser beam to modify a distribution of energy provided by the laser beam to the layer of powder.

15. The additive manufacturing apparatus of any preceding clause, wherein the impingement location is modified between successive pulses in an amount that is less than or equal to a spot size of the laser beam at the impingement location such that the successive pulses overlap one another to form an enlarged melt pool in the layer of powder.

16. The additive manufacturing apparatus of any preceding clause, wherein the impingement location is modified between successive pulses in an amount that is greater than a spot size of the laser beam at the impingement location such that the successive pulses do not overlap one another and each pulse forms a separate melt pool in the layer of powder.

17. The additive manufacturing apparatus of any preceding clause, further comprising a scanning element having a larger aperture than the solid state optical deflector, the scanning element scanning the laser beam along the layer of powder in a primary scanning direction at a primary scanning rate, wherein the solid state optical deflector modulates the propagation direction of the laser beam at the layer of powder in a direction that differs from the primary scanning direction to alter a shape of the laser beam upon incidence with the layer of powder.

18. The additive manufacturing apparatus of any preceding clause, wherein the solid state optical deflector modulates the propagation direction in a pattern that is dependent on an impingement location of the laser beam on the build platform.

19. A method of additively manufacturing an object, the method comprising:
depositing a layer of powder on a build platform;
generating a laser beam with a laser beam source; and
scanning the laser beam in a predetermined scanning pattern over the build platform to melt the layer of powder in a manner that corresponds the predetermined scanning pattern, wherein the scanning of the laser beam comprises modulating a propagation direction of the laser beam using a solid state optical deflector prior to the laser beam being incident on a layer of powder.

20. The method of any preceding clause, wherein the scanning of the laser beam in the predetermined scanning pattern comprises manipulating a primary scanning element to move the laser beam along the layer of powder in a primary scanning direction at a primary scanning rate that is less than one tenth of the angular velocity.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An additive manufacturing apparatus comprising:
a first laser beam source emitting a first laser beam;
a second laser beam source emitting a second laser beam;
a build platform;
a recoater depositing a layer of powder onto the build platform;
a scanning assembly disposed between the first and second laser beam sources and the build platform, the scanning assembly comprising at least one solid state optical deflector that adjusts a timing or a distribution of energy to the layer of powder using the first and second laser beams; and
a beam combiner comprising:
a first deflector directing the first laser beam to the at least one solid state optical deflector; and
a second deflector directing the second laser beam to the at least one solid state optical deflector; and
wherein at least one of the scanning assembly or the build platform is movably positionable to place various regions of the build platform within view of the scanning assembly.

2. The additive manufacturing apparatus of claim 1, wherein at least one of the first and second laser beams is a pulsed laser beam, and wherein the solid state optical deflector modifies the timing or the distribution of the energy to the layer of powder between pulses of the pulsed laser beam.

3. The additive manufacturing apparatus of claim 2, wherein or the distribution of the energy to the layer of powder is modified between successive pulses in an amount that is less than or equal to a beam spot size at the build platform such that the successive pulses overlap one another to form an enlarged melt pool in the layer of powder.

4. The additive manufacturing apparatus of claim 2, wherein the timing or the distribution of the energy to the layer of powder is modified between successive pulses in an amount that is greater than a beam spot size at the build platform such that the successive pulses do not overlap one another and each pulse forms a separate melt pool in the layer of powder.

5. The additive manufacturing apparatus of claim 1, wherein the solid state optical deflector is configured to adjust the timing or the distribution of energy to the layer of powder at an angular velocity that is greater than a primary rate of scanning in a primary scanning direction on the build platform, the primary rate being determined by relative motion between the build platform and the scanning assembly.

6. The additive manufacturing apparatus of claim 5, wherein the solid state optical deflector adjusts the timing or the distribution of energy to the layer of powder on the build platform in a direction that differs from the primary scanning direction.

7. The additive manufacturing apparatus of claim 6, wherein:
the solid state optical deflector is a two-dimensional deflector comprising a first solid state optical deflector and a second solid state optical deflector, the first and second solid state optical deflectors configured to adjust the timing or the distribution of energy to the layer of powder in different directions; and
the adjustment of the timing or the distribution of energy to the layer of powder in the direction that differs from the primary scanning direction occurs in a predetermined pattern such that the predetermined pattern extends in the primary scanning direction.

8. The additive manufacturing apparatus of claim 6, wherein the adjustment of the timing or the distribution of energy to the layer of powder on the build platform in the direction that differs from the primary scanning direction applies heat to the layer of powder either before the powder is melted or after the powder is melted in a predetermined pattern.

9. The additive manufacturing apparatus of claim 1, wherein:
the first laser beam source is a pulsed laser beam source; and
further comprising an optical switching unit disposed between the second laser beam source and the scanning assembly, the optical switching unit converting the second laser beam to a pulsed laser beam.

10. An additive manufacturing apparatus comprising:
a first laser beam source emitting a first laser beam;
a second laser beam source emitting a second laser beam;
a build platform;
a recoater depositing a layer of powder onto the build platform;
a solid state optical deflector;
a beam combiner disposed upstream of the solid state optical deflector, the beam combiner configured to generate a combined laser beam from the first and second laser beams, the solid state optical deflector configured to modulate a propagation direction of the combined laser beam at an angular velocity;
an optical assembly that conditions the combined laser beam prior to the combined laser beam being incident on the layer of powder; and
an optical switching unit disposed between the first laser beam source and the solid state optical deflector, the optical switching unit converting the first laser beam to a pulsed laser beam.

11. The additive manufacturing apparatus of claim 10, wherein the second laser beam source comprises a master oscillator power amplifier or a master oscillator fiber amplifier.

12. The additive manufacturing apparatus of claim 10, wherein the solid state optical deflector modifies an impingement location of the combined laser beam on the layer of powder between pulses of the first and second laser beams to modify a distribution of energy provided by the combined laser beam to the layer of powder.

13. The additive manufacturing apparatus of claim 12, wherein the impingement location is modified between successive pulses in an amount that is less than or equal to a spot size of the combined laser beam at the impingement location such that the successive pulses overlap one another to form an enlarged melt pool in the layer of powder.

14. The additive manufacturing apparatus of claim 12, wherein the impingement location is modified between successive pulses in an amount that is greater than a spot size of the combined laser beam at the impingement location such that the successive pulses do not overlap one another and each pulse forms a separate melt pool in the layer of powder.

15. The additive manufacturing apparatus of claim 10, wherein the solid state optical deflector modulates the propagation direction in a pattern that is dependent on an impingement location of the combined laser beam on the build platform.

* * * * *